US010101536B2

(12) United States Patent
Kopp et al.

(10) Patent No.: US 10,101,536 B2
(45) Date of Patent: Oct. 16, 2018

(54) MULTICHANNEL OPTICAL COUPLER ARRAY

(71) Applicant: Chiral Photonics, Inc., Pine Brook, NJ (US)

(72) Inventors: Victor Il'ich Kopp, Fair Lawn, NJ (US); Jongchul Park, Lake Hiawatha, NJ (US); Jonathan Singer, New Hope, PA (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 15/811,462

(22) Filed: Nov. 13, 2017

(65) Prior Publication Data

US 2018/0172916 A1    Jun. 21, 2018

Related U.S. Application Data

(63) Continuation-in-part of application No. 15/459,730, filed on Mar. 15, 2017, now Pat. No. 9,817,191, (Continued)

(51) Int. Cl.
*G02B 6/28* (2006.01)
*G02B 6/30* (2006.01)
(Continued)

(52) U.S. Cl.
CPC .............. *G02B 6/30* (2013.01); *G02B 6/024* (2013.01); *G02B 6/02042* (2013.01); *G02B 6/0288* (2013.01)

(58) Field of Classification Search
CPC ................................ G02B 6/28; G02B 6/2848
(Continued)

(56) References Cited

U.S. PATENT DOCUMENTS

| 4,773,924 | A | * | 9/1988 | Berkey | ............... C03B 23/0473 385/15 |
| 4,799,949 | A | * | 1/1989 | Keck | ................... C03B 23/0473 216/33 |

(Continued)

FOREIGN PATENT DOCUMENTS

| WO | WO 2002/073247 A2 | 9/2002 |
| WO | WO 2006/046947 A2 | 5/2006 |

(Continued)

OTHER PUBLICATIONS

International Search Report and Written Opinion in International Application No. PCT/US2017/059578, dated Feb. 19, 2018 in 9 pages.

*Primary Examiner* — Kaveh C Kianni
(74) *Attorney, Agent, or Firm* — Knobbe, Martens, Olson & Bear LLP

(57) ABSTRACT

A multichannel optical coupler array comprises a coupler housing structure and longitudinal waveguides. At least one of the longitudinal waveguides is a vanishing core waveguide. Light traveling from a first end to a second end can escape from an inner vanishing core into a corresponding outer core proximally to an intermediate cross section, and can escape from the outer core into a combined waveguide formed by at least two neighboring outer cores proximally to the second end.

1 Claim, 17 Drawing Sheets

Related U.S. Application Data which is a continuation-in-part of application No. 14/306,217, filed on Jun. 16, 2014, now Pat. No. 9,857,536, said application No. 15/811,462 is a continuation-in-part of application No. 15/617,684, filed on Jun. 8, 2017, which is a continuation-in-part of application No. 15/459,730, filed on Mar. 15, 2017, now Pat. No. 9,817,191, which is a continuation-in-part of application No. 14/306,217, filed on Jun. 16, 2014, now Pat. No. 9,857,536.

(60) Provisional application No. 62/417,180, filed on Nov. 3, 2016, provisional application No. 61/864,957, filed on Jun. 14, 2013, provisional application No. 62/564,178, filed on Sep. 27, 2017, provisional application No. 61/834,957, filed on Jun. 14, 2013.

(51) Int. Cl.
- *G02B 6/028* (2006.01)
- *G02B 6/02* (2006.01)
- *G02B 6/024* (2006.01)

(58) Field of Classification Search
USPC .......................................................... 385/11
See application file for complete search history.

(56) References Cited

U.S. PATENT DOCUMENTS

| | | | | |
|---|---|---|---|---|
| 4,902,324 | A * | 2/1990 | Miller | C03B 37/15 385/50 |
| 4,931,076 | A * | 6/1990 | Berkey | G02B 6/2835 385/15 |
| 5,009,692 | A * | 4/1991 | Miller | C03B 37/15 385/50 |
| 5,078,767 | A * | 1/1992 | Berkey | G02B 6/2835 65/110 |
| 5,864,644 | A * | 1/1999 | DiGiovanni | G02B 6/2856 385/43 |
| 5,898,715 | A * | 4/1999 | LeGrange | G02B 6/262 372/6 |
| 5,953,477 | A * | 9/1999 | Wach | A61B 5/14546 385/115 |
| 6,396,859 | B1 | 5/2002 | Kopp et al. | |
| 6,404,789 | B1 | 6/2002 | Kopp et al. | |
| 6,411,635 | B1 | 6/2002 | Kopp et al. | |
| 6,411,762 | B1 * | 6/2002 | Anthon | C03B 37/01211 385/123 |
| 6,456,637 | B1 * | 9/2002 | Holcomb | H01S 3/0675 359/341.3 |
| 6,513,994 | B1 * | 2/2003 | DiGiovanni | G01N 21/896 356/73.1 |
| 6,671,293 | B2 | 12/2003 | Kopp et al. | |
| 6,678,297 | B2 | 1/2004 | Kopp et al. | |
| 6,721,469 | B2 | 4/2004 | Kopp et al. | |
| 6,741,631 | B2 | 5/2004 | Kopp et al. | |
| 6,744,943 | B2 | 6/2004 | Kopp et al. | |
| 6,792,169 | B2 | 9/2004 | Kopp et al. | |
| 6,826,335 | B1 * | 11/2004 | Grudinin | B82Y 20/00 359/341.3 |
| 6,839,486 | B2 | 1/2005 | Kopp et al. | |
| 6,875,276 | B2 | 4/2005 | Shibayev et al. | |
| 6,891,992 | B2 | 5/2005 | Kopp et al. | |
| 6,925,230 | B2 | 8/2005 | Kopp et al. | |
| 6,959,022 | B2 * | 10/2005 | Sandrock | C03B 37/01426 372/6 |
| 7,009,679 | B2 | 3/2006 | Kopp et al. | |
| 7,046,432 | B2 * | 5/2006 | Starodoumov | H01S 3/094003 359/341.32 |
| 7,095,911 | B2 | 8/2006 | Kopp et al. | |
| 7,142,280 | B2 | 11/2006 | Kopp et al. | |
| 7,242,702 | B2 | 7/2007 | Kopp et al. | |
| 7,242,827 | B1 * | 7/2007 | Bochove | G02B 6/02042 385/15 |
| 7,308,173 | B2 * | 12/2007 | Kopp | C03B 37/01245 385/15 |
| 7,409,128 | B2 * | 8/2008 | Holcomb | H01S 3/094003 372/6 |
| 7,437,046 | B2 * | 10/2008 | DiGiovanni | G02B 6/0365 385/126 |
| 7,463,800 | B2 | 12/2008 | Kopp et al. | |
| 7,983,515 | B2 | 7/2011 | Zhang et al. | |
| 8,218,921 | B2 | 7/2012 | Kopp et al. | |
| 8,326,099 | B2 | 12/2012 | Singer et al. | |
| 8,457,456 | B2 | 6/2013 | Kopp et al. | |
| 8,463,094 | B2 | 6/2013 | Kopp et al. | |
| 8,712,199 | B2 * | 4/2014 | Kopp | G02B 6/30 385/115 |
| 8,948,547 | B2 | 2/2015 | Kopp | |
| 9,063,289 | B1 * | 6/2015 | Farmer | G02B 6/2821 |
| 9,316,788 | B2 * | 4/2016 | Witzens | G02B 6/125 |
| 9,335,467 | B2 * | 5/2016 | Kokubun | G02B 6/02042 |
| 9,766,407 | B2 | 9/2017 | Weiner et al. | |
| 9,810,845 | B2 | 11/2017 | Kopp | |
| 9,817,191 | B2 | 11/2017 | Kopp et al. | |
| 9,851,510 | B2 | 12/2017 | Kopp | |
| 9,857,536 | B2 | 1/2018 | Kopp et al. | |
| 2002/0003827 | A1 | 1/2002 | Genack et al. | |
| 2002/0069676 | A1 | 6/2002 | Kopp et al. | |
| 2002/0118710 | A1 | 8/2002 | Kopp et al. | |
| 2002/0122629 | A1 * | 9/2002 | Grubsky | G02B 6/021 385/37 |
| 2002/0172461 | A1 | 11/2002 | Singer et al. | |
| 2002/0172486 | A1 * | 11/2002 | Fermann | H01S 3/06708 385/128 |
| 2003/0118285 | A1 | 6/2003 | Kopp et al. | |
| 2004/0008955 | A1 * | 1/2004 | Patlakh | G02B 6/255 385/95 |
| 2004/0145704 | A1 | 7/2004 | Kopp et al. | |
| 2004/0156401 | A1 * | 8/2004 | Sandrock | C03B 37/01426 372/6 |
| 2005/0094952 | A1 * | 5/2005 | Gonthier | G02B 6/02009 385/100 |
| 2005/0105866 | A1 * | 5/2005 | Grudinin | B82Y 20/00 385/123 |
| 2005/0157998 | A1 * | 7/2005 | Dong | G02B 6/02009 385/126 |
| 2006/0008219 | A1 * | 1/2006 | Davis | H01S 3/06704 385/123 |
| 2006/0045444 | A1 * | 3/2006 | Miller | C03C 25/107 385/115 |
| 2006/0219673 | A1 * | 10/2006 | Varnham | B23K 26/0734 219/121.6 |
| 2007/0104431 | A1 * | 5/2007 | Di Teodoro | G02B 6/02347 385/123 |
| 2007/0172174 | A1 * | 7/2007 | Scerbak | G02B 6/4296 385/76 |
| 2007/0237453 | A1 | 10/2007 | Nielsen et al. | |
| 2007/0280597 | A1 | 12/2007 | Nakai et al. | |
| 2008/0056656 | A1 * | 3/2008 | Dong | G02B 6/02009 385/125 |
| 2008/0098772 | A1 | 5/2008 | Kopp et al. | |
| 2008/0193093 | A1 * | 8/2008 | DiGiovanni | G02B 6/0365 385/115 |
| 2008/0209952 | A1 | 9/2008 | Tremblay | |
| 2009/0059966 | A1 * | 3/2009 | Mayer | G02B 6/4403 372/6 |
| 2009/0154881 | A1 * | 6/2009 | Salokatve | G02B 6/25 385/46 |
| 2009/0245728 | A1 | 10/2009 | Cherchi et al. | |
| 2009/0324159 | A1 | 12/2009 | Kopp et al. | |
| 2010/0002983 | A1 | 1/2010 | Kopp et al. | |
| 2010/0158438 | A1 | 6/2010 | Churikov et al. | |
| 2011/0026880 | A1 | 2/2011 | Galli et al. | |
| 2011/0280517 | A1 * | 11/2011 | Fini | G02B 6/02042 385/43 |
| 2011/0292676 | A1 | 12/2011 | Weiner et al. | |
| 2011/0293219 | A1 | 12/2011 | Weiner et al. | |
| 2012/0189241 | A1 | 7/2012 | Kopp et al. | |

(56) References Cited

U.S. PATENT DOCUMENTS

| | | |
|---|---|---|
| 2012/0257857 A1 | 10/2012 | Kopp et al. |
| 2013/0121641 A1 | 5/2013 | Singer et al. |
| 2013/0188174 A1 | 7/2013 | Kopp et al. |
| 2013/0188175 A1 | 7/2013 | Kopp et al. |
| 2013/0209112 A1* | 8/2013 | Witzens ............... G02B 6/2813 398/214 |
| 2013/0216184 A1 | 8/2013 | Kopp et al. |
| 2013/0223795 A1 | 8/2013 | Sasaoka et al. |
| 2015/0212274 A1 | 7/2015 | Kopp |
| 2017/0219774 A1 | 8/2017 | Kopp |
| 2017/0268937 A1 | 9/2017 | Kopp et al. |
| 2017/0269277 A1 | 9/2017 | Weiner et al. |
| 2017/0269293 A1 | 9/2017 | Churikov et al. |
| 2017/0276867 A1 | 9/2017 | Kopp |
| 2017/0299806 A1 | 10/2017 | Kopp |
| 2017/0336570 A1 | 11/2017 | Kopp et al. |
| 2017/0336659 A1 | 11/2017 | Kopp et al. |

FOREIGN PATENT DOCUMENTS

| | | |
|---|---|---|
| WO | WO 2008/080174 A1 | 7/2008 |
| WO | WO 2017/053479 A1 | 3/2017 |
| WO | WO 2017/100667 A1 | 6/2017 |

\* cited by examiner

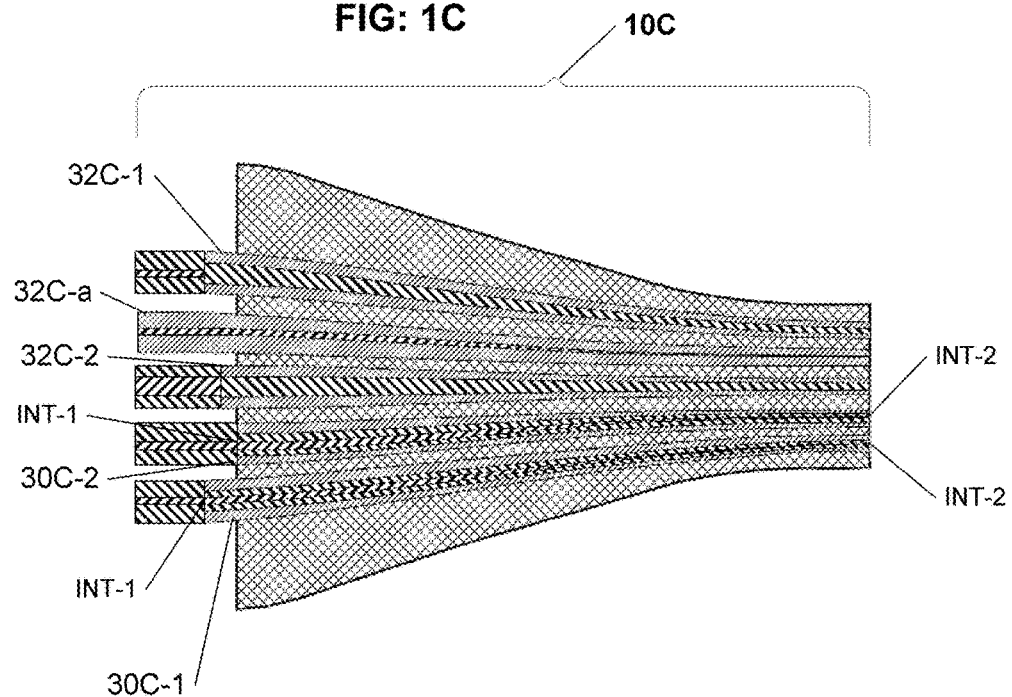
FIG: 1C
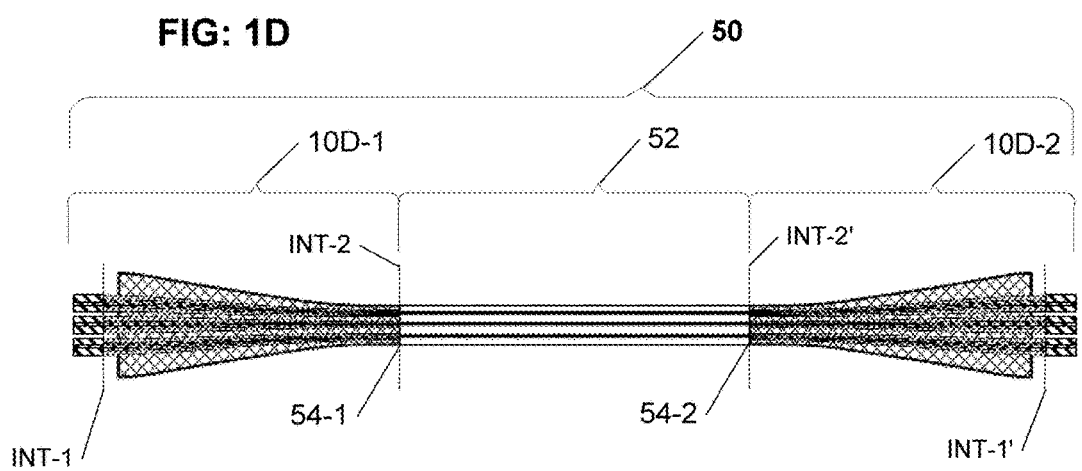
FIG: 1D

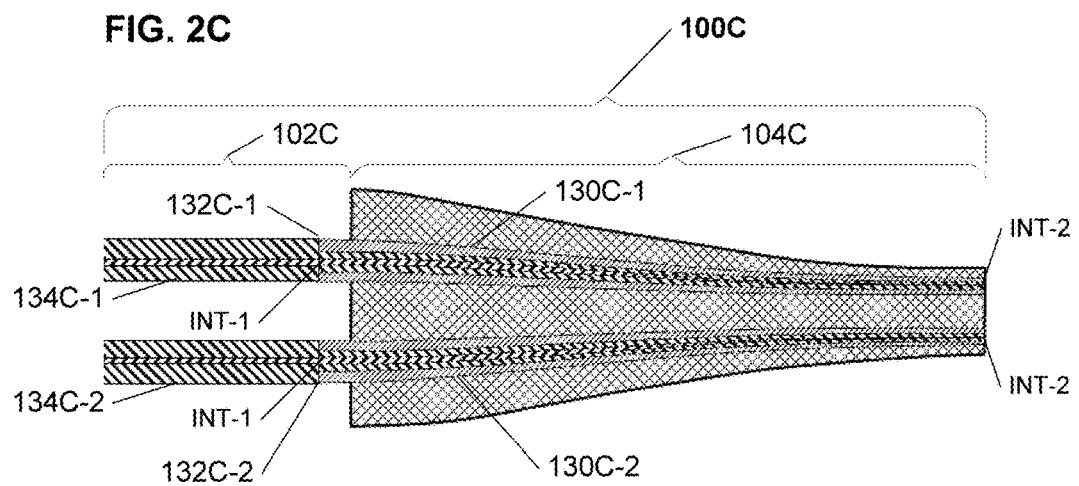
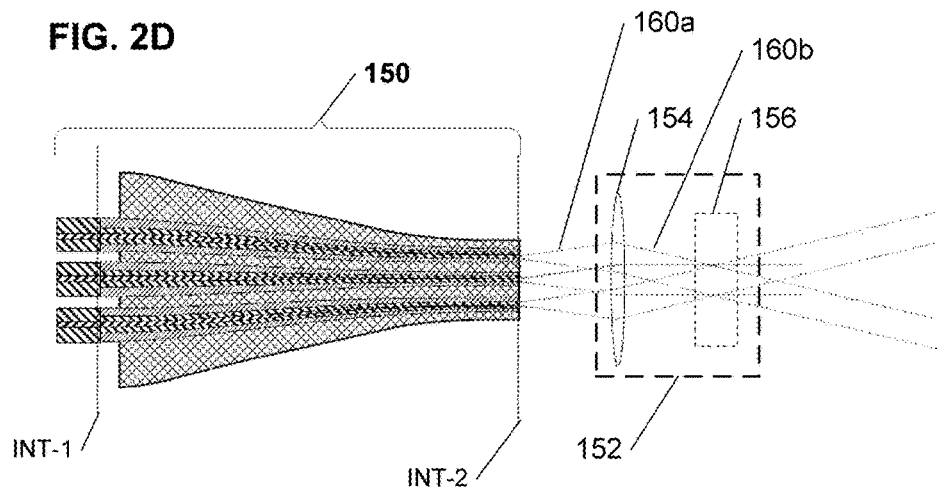

MULTICHANNEL OPTICAL COUPLER ARRAY

CROSS-REFERENCE TO RELATED APPLICATIONS

This application is a continuation-in-part of U.S. application Ser. No. 15/459,730, entitled "MULTICHANNEL OPTICAL COUPLER ARRAY," filed Mar. 15, 2017, which claims the benefit of U.S. Provisional Application No. 62/417,180, entitled "MULTICHANNEL OPTICAL COUPLER ARRAY," filed Nov. 3, 2016 and which is a continuation-in-part of U.S. application Ser. No. 14/306,217, entitled "OPTICAL COMPONENT ASSEMBLY FOR USE WITH AN OPTICAL DEVICE," filed Jun. 16, 2014, which claims the benefit of U.S. Provisional Application No. 61/834,957, entitled "OPTICAL COMPONENT ASSEMBLY FOR USE WITH AN OPTICAL DEVICE," filed Jun. 14, 2013. This application also claims the benefit of U.S. Provisional Application No. 62/564,178, entitled "MULTICHANNEL OPTICAL COUPLER ARRAY," filed Sep. 27, 2017 and is a continuation-in-part of U.S. application Ser. No. 15/617,684, entitled "CONFIGURABLE POLARIZATION MODE COUPLER," filed Jun. 8, 2017, which is is a continuation-in-part of U.S. application Ser. No. 15/459,730, entitled "MULTICHANNEL OPTICAL COUPLER ARRAY," filed Mar. 15, 2017, which claims the benefit of U.S. Provisional Application No. 62/417,180, entitled "MULTICHANNEL OPTICAL COUPLER ARRAY," filed Nov. 3, 2016 and which is a continuation-in-part of U.S. application Ser. No. 14/306,217, entitled "OPTICAL COMPONENT ASSEMBLY FOR USE WITH AN OPTICAL DEVICE," filed Jun. 16, 2014, which claims the benefit of U.S. Provisional Application No. 61/834,957, entitled "OPTICAL COMPONENT ASSEMBLY FOR USE WITH AN OPTICAL DEVICE," filed Jun. 14, 2013. The entirety of each application referenced in this paragraph is expressly incorporated herein by reference.

BACKGROUND

Field of the Invention

The present disclosure relates generally to an optical coupler array, e.g., a multichannel optical coupler array, for coupling, e.g., a plurality of optical fibers to at least one optical device. Some embodiments can relate to coupling light to and from a plurality of fibers, such as to and from one or more single mode fibers, few-mode fibers, multimode fibers, multicore single mode fibers, multicore few-mode fibers, and/or multicore multimode fibers. Some embodiments can relate to coupling light to and from photonic integrated circuits (PICs) and to and from multicore fibers (MCFs). Some embodiments can relate generally to high power single mode laser sources, and to devices for coherent combining of multiple optical fiber lasers to produce multi-kilowatt single mode laser sources. Some embodiments may relate to phase locked optical fiber components of a monolithic design that may be fabricated with a very high degree of control over precise positioning (e.g. transverse or cross-sectional positioning) of even large quantities of plural waveguides, and that may potentially be configurable for increasing or optimization of the components' fill factor (which can be related to the ratio of the mode field diameter of each waveguide at the "output" end thereof, to the distance between neighboring waveguides).

Description of the Related Art

Optical waveguide devices are useful in various high technology industrial applications, and especially in telecommunications. In recent years, these devices, including planar waveguides, two or three dimensional photonic crystals, multi-mode fibers, multicore single-mode fibers, multicore few-mode fibers, and multicore multi-mode fibers are being employed increasingly in conjunction with conventional optical fibers. In particular, optical waveguide devices based on refractive index contrast or numerical aperture (NA) waveguides that are different from that of conventional optical fibers and multichannel devices are advantageous and desirable in applications in which conventional optical fibers are also utilized. However, there are significant challenges in interfacing dissimilar NA waveguide devices and multichannel devices with channel spacing less than a diameter of conventional fibers, with conventional optical fibers. For example, in some cases, at least some of the following obstacles may be encountered: (1) the difference between the sizes of the optical waveguide device and the conventional fiber (especially with respect to the differences in core sizes), (2) the difference between the NAs of the optical waveguide device and the conventional fiber, and (3) the channel spacing smaller than the diameter of conventional fibers. Failure to properly address these obstacles can result in increased insertion losses and a decreased coupling coefficient at each interface.

For example, conventional optical fiber based optical couplers, such as shown in FIG. 6 (Prior Art) can be configured by inserting standard optical fibers (used as input fibers) into a capillary tube comprised of a material with a refractive index lower than the cladding of the input fibers. However, there are a number of disadvantages to this approach. For example, a fiber cladding-capillary tube interface becomes a light guiding interface of a lower quality than interfaces inside standard optical fibers and, therefore, can be expected to introduce optical loss. Furthermore, the capillary tube must be fabricated using a costly fluorine-doped material, greatly increasing the expense of the coupler.

U.S. Pat. No. 7,308,173, entitled "OPTICAL FIBER COUPLER WITH LOW LOSS AND HIGH COUPLING COEFFICIENT AND METHOD OF FABRICATION THEREOF", which is hereby incorporated herein in its entirety, advantageously addressed some of the issues discussed above by providing various embodiments of an optical fiber coupler capable of providing a low-loss, high-coupling coefficient interface between conventional optical fibers and optical waveguide devices.

Nevertheless, a number of challenges still remained. With the proliferation of multichannel optical devices (e.g., waveguide arrays), establishing low-loss high-accuracy connections to arrays of low or high NA waveguides often was problematic, especially because the spacing between the waveguides is very small making coupling thereto all the more difficult. U.S. Pat. No. 8,326,099, entitled "OPTICAL FIBER COUPLER ARRAY", issued Dec. 4, 2012, which is hereby incorporated herein by reference in its entirety, endeavors to address the above challenge by providing, in at least a portion of the embodiments thereof, an optical fiber coupler array that provides a high-coupling coefficient interface with high accuracy and easy alignment between an optical waveguide device having a plurality of closely spaced waveguides, and a plurality of optical fibers separated by at least a fiber diameter.

U.S. Pat. No. 8,712,199, entitled "CONFIGURABLE PITCH REDUCING OPTICAL FIBER ARRAY", which is expressly incorporated by reference herein, discusses the importance of cross sectional or transverse positioning accuracy (precise cross sectional positioning in some cases) of the individual waveguides. Improved cross sectional positioning accuracy of the waveguides remains desirable.

It is also desirable to improve and/or optimize optical coupling between a set of isolated fibers (e.g., single mode fibers) at one end and individual modes (e.g, of a few-mode or multimode fiber) and/or cores (e.g., of a multicore fiber) at another end.

SUMMARY

Example embodiments described herein have innovative features, no single one of which is indispensable or solely responsible for their desirable attributes. Without limiting the scope of the claims, some of the advantageous features will now be summarized.

EMBODIMENTS

1. A multichannel optical coupler array for optical coupling of a plurality of optical fibers to an optical device, comprising:
    an elongated optical element having a first end operable to optically couple with said plurality optical fibers and a second end operable to optically couple with said optical device, and comprising:
        a common single coupler housing structure; a plurality of longitudinal waveguides each positioned at a predetermined spacing from one another, each having a capacity for at least one optical mode of a predetermined mode field profile, each embedded in said common single housing structure proximally to said second end, wherein at, least one of said plural longitudinal waveguides is a vanishing core waveguide, each said at least one vanishing core waveguide comprising:
            an inner vanishing core, having a first refractive index (N-1), and having a first inner core size (ICS-I) at said first end, and a second inner core size (ICS-2) at said second end; an outer core, longitudinally surrounding said inner core, having a second refractive index (N-2), and having a first outer core size (OCS-I) at said first end, and a second outer core size (OCS-2) at said second end, and an outer cladding, longitudinally surrounding said outer core, having a third refractive index (N-3), a first cladding size at said first end, and a second cladding size at said second end; and
            wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3),
    wherein a total volume of said medium or said common single coupler housing structure, is greater than a total volume or all said vanishing core waveguides inner cores and said outer cores confined within said common single coupler housing structure, and wherein said first inner vanishing core size (ICS-I), said first outer core size (OCS-I), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:
        light traveling from said first end to said second end escapes from said inner vanishing core into said corresponding outer core proximally to said second end, and light traveling from said second end to said first end moves from said outer core into said corresponding inner vanishing core proximally to said first end,
    and wherein said common single coupler housing structure proximally to said first end has one of the following cross sectional configurations: a ring surrounding said plurality of longitudinal waveguides, a transversely contiguous structure with plurality of holes, wherein at least one said hole contains at least one of said plurality of longitudinal waveguides.

2. A multichannel optical coupler array, comprising:
    an elongated optical element having a first end and a second end, wherein said first and second ends are operable to optically couple with a plurality of optical fibers, an optical device, or combinations thereof, the optical element further comprising:
        a coupler housing structure; and
        a plurality of longitudinal waveguides arranged with respect to one another, each having a capacity for at least one optical mode, the plurality of longitudinal waveguides embedded in said housing structure, wherein said plurality of longitudinal waveguides comprises at least one vanishing core waveguide, each said at least one vanishing core waveguide, said at least one vanishing core waveguide comprising:
            an inner vanishing core, having a first refractive index (N-1), and having an inner core size;
            an outer core, longitudinally surrounding said inner core, having a second refractive index (N-2), and having an outer core size; and
            an outer cladding, longitudinally surrounding said outer core, having a third refractive index (N-3), and having a cladding size;
    wherein said coupler housing structure comprises a medium having a fourth refractive index (N-4) surrounding said plurality of longitudinal waveguides, wherein N-1>N-2>N-3,
    wherein said inner core size, said outer core size, and spacing between said plurality of longitudinal waveguides reduces along said optical element from said first end to said second end such that at said second end, said inner core size is insufficient to guide light therethrough, and said outer core size is sufficient to guide at least one optical mode, and
    wherein said coupler housing structure at a proximity to the first end has one of the following cross sectional configurations: a ring surrounding said plurality of longitudinal waveguides with a gap between said ring and said plurality of longitudinal waveguides, or a structure with a plurality of holes, at least one hole containing at least one of said plurality of longitudinal waveguides.

3. The optical coupler array of embodiment 2, wherein the coupler housing structure comprises a common single coupler housing structure.

4. The optical coupler array of any of the preceding embodiments, wherein proximate the first end, one of the plurality of longitudinal waveguides extends outside the coupler housing structure.

5. The optical coupler array of any of the preceding embodiments, wherein proximate the first end, one of the plurality of longitudinal waveguides is disposed within the coupler housing structure and does not extends beyond the coupler housing structure.

6. The optical coupler array of any of the preceding embodiments, wherein proximate the first end, one of the plurality of longitudinal waveguides is disposed at an outer cross sectional boundary region of the coupler housing structure and does not extends beyond the coupler housing structure.

7. The optical coupler array of any of Embodiments 2-6, wherein the medium is a transversely contiguous medium.

8. The optical coupler array of any of Embodiments 2-7, wherein a total volume of said medium of said coupler housing structure is greater than a total volume of all the inner and outer cores of the at least one vanishing core waveguide confined within said coupler housing structure.

9. The optical coupler array of any of Embodiments 2-8, wherein said inner core size, said outer core size, and spacing between said plurality of longitudinal waveguides simultaneously and gradually reduces from said first end to said second end.

10. The optical coupler array of any of the preceding embodiments, wherein proximate the second end, the coupler array comprises substantially no gap between the coupler housing structure and the plurality of longitudinal waveguides.

11. The optical coupler array of any of the preceding embodiments, wherein the one of the cross sectional configurations is the ring surrounding said plurality of longitudinal waveguides.

12. The optical coupler array of Embodiment 11, wherein the plurality of longitudinal waveguides are in a hexagonal arrangement.

13. The optical coupler array of any of Embodiments 11-12, wherein the ring has a circular inner cross section.

14. The optical coupler array of any of Embodiments 11-12, wherein the ring has a non-circular inner cross section.

15. The optical coupler array of Embodiment 14, wherein the inner cross section is hexagonal.

16. The optical coupler array of Embodiment 14, wherein the inner cross section is D-shaped.

17. The optical coupler array of any of Embodiments 11-16, wherein the ring has a circular outer cross section.

18. The optical coupler array of any of Embodiments 11-16, wherein the ring has a non-circular outer cross section.

19. The optical coupler array of Embodiment 18, wherein the outer cross section is hexagonal.

20. The optical coupler array of Embodiment 18, wherein the outer cross section is D-shaped.

21. The optical coupler array of any of Embodiments 1-10, wherein the one of the cross sectional configurations is the structure with the plurality of holes.

22. The optical coupler array of Embodiment 21, wherein the holes are in a hexagonal arrangement.

23. The optical coupler array of Embodiment 21, wherein the holes are in a rectangular arrangement.

24. The optical coupler array of Embodiment 21, wherein said plurality of holes is defined in an XY array.

25. The optical coupler array of any of Embodiments 21-24, wherein at least one hole comprises non-waveguide material.

26. The optical coupler array of any of Embodiments 21-25, wherein at least one hole has a circular cross section.

27. The optical coupler array of any of Embodiments 21-26, wherein at least one hole has a non-circular cross section.

28. The optical coupler array of Embodiment 27, wherein the non-circular cross section is D-shaped.

29. The optical coupler array of any of Embodiments 21-28, wherein at least one of the holes has a different dimension than another one of the holes.

30. The optical coupler array of any of Embodiments 21-29, wherein at least one of the holes has a different shape than another one of the holes.

31. The optical coupler array of any of Embodiments 21-30, wherein the holes are isolated.

32. The optical coupler array of any of Embodiments 21-30, wherein some of the holes are connected.

33. The optical coupler array of any of the preceding embodiments, wherein the at least one vanishing core waveguide comprises a single mode fiber.

34. The optical coupler array of any of the preceding embodiments, wherein the at least one vanishing core waveguide comprises a multi-mode fiber.

35. The optical coupler array of any of the preceding embodiments, wherein the at least one vanishing core waveguide comprises a polarization maintaining fiber.

36. A multichannel optical coupler array, comprising:
an elongated optical element having a first end and a second end, wherein said first and second ends are operable to optically couple with a plurality of optical fibers, an optical device, or combinations thereof, the optical element further comprising:
a coupler housing structure; and
a plurality of longitudinal waveguides arranged with respect to one another, each having a capacity for at least one optical mode, the plurality of longitudinal waveguides embedded in said housing structure, wherein said plurality of longitudinal waveguides comprises at least one vanishing core waveguide, each said at least one vanishing core waveguide, said at least one vanishing core waveguide comprising:
an inner vanishing core having a first refractive index (N-1), and having an inner core size;
an outer core, longitudinally surrounding said inner core, having a second refractive index (N-2) and having an outer core size; and
an outer cladding, longitudinally surrounding said outer core, having a third refractive index (N-3), and having a cladding size;
wherein said coupler housing structure comprises a medium having a fourth refractive index (N-4) surrounding said plurality of longitudinal waveguides, wherein N-1>N-2>N-3,
wherein said inner core size, said outer core size, and spacing between said plurality of longitudinal waveguides reduces along said elongated optical element from said first end to said second end such that at said second end, said inner core size is insufficient to guide light therethrough, and said outer core size is sufficient to guide at least one optical mode, and wherein said coupler housing structure at a proximity to the first end has a cross sectional configuration comprising at least one hole, the at least one hole containing at least one of said plurality of longitudinal waveguides, wherein the hole is larger than the at least one of said plurality of longitudinal waveguides such that the at least one of said plurality of longitudinal waveguides is movable with respect to the coupler housing structure in a lateral direction.

37. The optical coupler array of Embodiment 36, wherein the coupler housing structure comprises a common single coupler housing structure.

38. The optical coupler array of any of Embodiments 36-37, wherein proximate the first end, one of the plurality of longitudinal waveguides extends outside the coupler housing structure.

39. The optical coupler array of any of Embodiments 36-38, wherein proximate the first end, one of the plurality of longitudinal waveguides is disposed within the coupler housing structure.

40. The optical coupler array of any of Embodiments 36-39, wherein the medium is a transversely contiguous medium.

41. The optical coupler array of any of Embodiments 36-40, wherein a total volume of said medium of said coupler housing structure is greater than a total volume of all the inner and outer cores of the at least one vanishing core waveguide confined within said coupler housing structure.

42. The optical coupler array of any of Embodiments 36-41, wherein said inner core size, said outer core size, and spacing between said plurality of longitudinal waveguides simultaneously and gradually reduces from said first end to said second end.

43. The optical coupler array of any of Embodiments 36-42, wherein proximate the second end, the coupler array comprises substantially no gap between the coupler housing structure and the plurality of longitudinal waveguides.

44. The optical coupler array of any Embodiments 36-43, wherein the at least one hole comprises a single hole and the at least one of said plurality of longitudinal waveguides comprises a plurality of longitudinal waveguides.

45. The optical coupler array of Embodiment 44, wherein the plurality of longitudinal waveguides are in a hexagonal arrangement.

46. The optical coupler array of any of Embodiments 44-45, wherein the single hole as a circular cross section.

47. The optical coupler array of any of Embodiments 44-45, wherein the single hole has a non-circular cross section.

48. The optical coupler array of Embodiment 47, wherein the non-circular cross section is hexagonal.

49. The optical coupler array of Embodiment 47, wherein the non-circular cross section is D-shaped.

50. The optical coupler array of any of Embodiments 44-49, wherein the coupler housing structure has a circular outer cross section.

51. The optical coupler array of any of Embodiments 44-49, wherein the coupler housing structure has a non-circular outer cross section.

52. The optical coupler array of Embodiment 51, wherein the outer cross section is hexagonal.

53. The optical coupler array of Embodiment 51, wherein the outer cross section is D-shaped.

54. The optical coupler array of any of Embodiments 36-43, wherein the at least one hole comprises a plurality of holes.

55. The optical coupler array of Embodiment 54, wherein the plurality of holes are in a hexagonal arrangement.

56. The optical coupler array of Embodiment 54, wherein the plurality of holes are in a rectangular arrangement.

57. The optical coupler array of Embodiment 54, wherein said plurality of holes is defined by an XY array.

58. The optical coupler array of any of Embodiments 54-57, wherein one or more of the plurality of holes comprises non-waveguide material.

59. The optical coupler array of any of Embodiments 54-58, wherein one or more of the plurality of holes has a circular cross section.

60. The optical coupler array of any of Embodiments 54-59, wherein one or more of the plurality of holes has a non-circular cross section.

61. The optical coupler array of Embodiment 60, wherein the non-circular cross section is D-shaped.

62. The optical coupler array of any of Embodiments 54-61, wherein one or more of the plurality of holes has a different dimension than another one of the holes.

63. The optical coupler array of any of Embodiments 54-62, wherein one or more of the plurality of holes has a different shape than another one of the holes.

64. The optical coupler array of any of Embodiments 54-63, wherein the holes are isolated.

65. The optical coupler array of any of Embodiments 54-63, wherein some of the holes are connected.

66. The optical coupler array of any of Embodiments 54-65, wherein the at least one vanishing core waveguide comprises a single mode fiber.

67. The optical coupler array of any of Embodiments 54-66, wherein the at least one vanishing core waveguide comprises a multi-mode fiber.

68. The optical coupler array of any of Embodiments 54-67, wherein the at least one vanishing core waveguide comprises a polarization maintaining fiber.

Additional Embodiments

1. A multichannel optical coupler array for optical coupling a plurality of optical fibers to an optical device, comprising:

an elongated optical element having a first end operable to optically couple with said plurality optical fibers and a second end operable to optically couple with said optical device, and comprising:

a common single coupler housing structure; a plurality of longitudinal waveguides each positioned at a predetermined spacing from one another, each having a capacity for at least one optical mode of a predetermined mode field profile, each embedded in said common single housing structure, wherein at, least one of said plural longitudinal waveguides is a vanishing core waveguide, each said at least one vanishing core waveguide comprising:

an inner vanishing core, having a first refractive index (N-1), and having a first inner core size (ICS-I) at said first end, and a second inner core size (ICS-2) at said second end; an outer core, longitudinally surrounding said inner core, having a second refractive index (N-2), and having a first outer core size (OCS-I) at said first end, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium or said common single coupler housing structure, is greater than a total volume or all said vanishing core waveguides inner cores and said outer cores confined within said common single coupler housing structure, and wherein said first inner vanishing core size (ICS-I), said first outer core size (OCS-I), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:

light traveling from said first end to said second end escapes from said inner vanishing core into said corresponding outer core proximally to said second end, and light traveling from said second end to said first end moves from said outer core into said corresponding inner vanishing core proximally to said first end, and wherein said common single coupler housing structure at a close proximity to the first end has one of the following cross sectional configurations: a ring surrounding said plurality of longitudinal waveguides, a contiguous structure with plurality of holes, at least one hole containing at least one of said plurality of longitudinal waveguides.

2. A multichannel optical coupler array for optical coupling a plurality of optical fibers to an optical device, comprising:
an elongated optical element having a first end operable to optically couple with said plurality optical fibers and a second end operable to optically couple with said optical device, and comprising:
a coupler housing structure; a plurality of longitudinal waveguides each positioned at a spacing from one another, each having a capacity for at least one optical mode, each embedded in said housing structure, wherein at, least one of said plural longitudinal waveguides is a vanishing core waveguide, each said at least one vanishing core waveguide comprising:
an inner vanishing core, having a first refractive index (N-1), and having a first inner core size (ICS-I) at said first end, and a second inner core size (ICS-2) at said second end; an outer core, longitudinally surrounding said inner core, having a second refractive index (N-2), and having a first outer core size (OCS-I) at said first end, and a second outer core size (OCS-2) at said second end, and an outer cladding, longitudinally surrounding said outer core, having a third refractive index (N-3), a first cladding size at said first end, and a second cladding size at said second end; and wherein said coupler housing structure comprises a medium having a fourth refractive index (N-4) surrounding said plural longitudinal waveguides, wherein a relative magnitude relationship between said first, second, third and fourth refractive indices (N-1, N-2, N-3, and N-4, respectively), comprises the following magnitude relationship: (N-1>N-2>N-3), wherein said first inner vanishing core size (ICS-I), said first outer core size (OCS-I), and said spacing between said plural longitudinal waveguides, reduces between said first end and said second end along said optical element, until said second inner vanishing core size (ICS-2) and said second outer core size (OCS-2) are reached, wherein said second inner vanishing core size (ICS-2) is insufficient to guide light therethrough, and said second outer core size (OCS-2) is sufficient to guide at least one optical mode, such that:

light traveling from said first end to said second end escapes from said inner vanishing core into said corresponding outer core proximally to said second end, and light traveling from said second end to said first end moves from said outer core into said corresponding inner vanishing core proximally to said first end, and wherein said coupler housing structure at a close proximity to the first end has one of the following cross sectional configurations: a ring surrounding said plurality of longitudinal waveguides, or a structure with plurality of holes, at least one hole containing at least one of said plurality of longitudinal waveguides.

Further Embodiments

1. A multichannel optical coupler array for optical coupling of a plurality of optical fibers to an optical device, comprising:
an elongated optical element having a first end operable to optically couple with said plurality optical fibers, an intermediate cross section, and a second end operable to optically couple with said optical device, and comprising:
a common single coupler housing structure; a plurality of longitudinal waveguides each positioned at a predetermined spacing from one another, each having a capacity for at least one optical mode of a predetermined mode field profile, each embedded in said common single housing structure proximally to said second end, wherein at least one of said plural longitudinal waveguides is a vanishing core waveguide, each said at least one vanishing core waveguide comprising:
an inner vanishing core, having a first refractive index (N-1), and having a first inner core size (ICS-I) at said first end, an intermediate inner core size (ICS-IN) at said intermediate cross section, and a second inner core size (ICS-2) at said second end; an outer core, longitudinally surrounding said inner core, having a second refractive index (N-2), and having a first outer core size (OCS-I) at said first end, an intermediate outer core size (OCS-IN) at said intermediate cross section, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium or said common single coupler housing structure, is greater than a total volume or all said vanishing core waveguides inner cores and said outer cores confined within said common single coupler housing structure, and wherein said first inner vanishing core size (ICS-I), said first outer core size (OCS-I), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said intermediate inner vanishing core size (ICS-IN) is selected to be insufficient to guide light therethrough, and said intermediate outer core size (OCS-IN) is selected to be sufficient to guide at least one optical mode, and said second outer core size (OCS-2) is selected to be insufficient to guide light therethrough such that:

light traveling from said first end to said second end escapes from said inner vanishing core into said corresponding outer core proximally to said intermediate cross section, and escapes from said outer core into a combined waveguide formed by at least two neighboring outer cores proximally to said second end, and at least one waveguide mode of light traveling from said second end to said first end moves from the combined waveguide formed by at least two neighboring outer cores into said outer core proximally to said intermediate cross section, and moves from said outer core into said corresponding inner vanishing core proximally to said first end, and wherein said common single coupler housing structure proximally to said first end has a cross sectional configuration comprising a transversely contiguous structure with at least one hole, wherein the at least one hole contains at least one of said plurality of longitudinal waveguides creating a gap between the coupler housing structure and the at least one of said plurality of longitudinal waveguides.

2. A multichannel optical coupler array comprising:
an elongated optical element having a first end, an intermediate cross section, and a second end, and comprising:
  a coupler housing structure; a plurality of longitudinal waveguides each positioned at a spacing from one another, each having a capacity for at least one optical mode, each disposed in said housing structure, wherein at least one of said plural longitudinal waveguides is a vanishing core waveguide, each said at least one vanishing core waveguide comprising:
    an inner vanishing core, having a first refractive index (N-1), and having a first inner core size (ICS-I) at said first end, an intermediate inner core size (ICS-IN) at said intermediate cross section, and a second inner core size (ICS-2) at said second end; an outer core, longitudinally surrounding said inner core, having a second refractive index (N-2), and having a first outer core size (OCS-I) at said first end, an intermediate outer core size (OCS-IN) at said intermediate cross section, and a second outer core size (OCS-2) at said second end, and an outer cladding, longitudinally surrounding said outer core, having a third refractive index (N-3), a first cladding size at said first end, and a second cladding size at said second end; and wherein said coupler housing structure comprises a medium having a fourth refractive index (N-4) surrounding said plural longitudinal waveguides, wherein a relative magnitude relationship between said first, second, third and fourth refractive indices (N-1, N-2, N-3, and N-4, respectively), comprises the following magnitude relationship: (N-1>N-2>N-3), and wherein said first inner vanishing core size (ICS-I), said first outer core size (OCS-I), and said spacing between said plural longitudinal waveguides are reduced between said first end and said second end along said optical element, wherein said intermediate inner vanishing core size (ICS-IN) is insufficient to guide light therethrough, and said intermediate outer core size (OCS-IN) is sufficient to guide at least one optical mode, and said second outer core size (OCS-2) is insufficient to guide light therethrough such that:

light traveling from said first end to said second end escapes from said inner vanishing core into said corresponding outer core proximally to said intermediate cross section, and escapes from said outer core into a combined waveguide formed by at least two neighboring outer cores proximally to said second end, and at least one waveguide mode of light traveling from said second end to said first end moves from the combined waveguide formed by at least two neighboring outer cores into said outer core proximally to said intermediate cross section, and moves from said outer core into said corresponding inner vanishing core proximally to said first end.

BRIEF DESCRIPTION OF THE DRAWINGS

In the drawings, wherein like reference characters denote corresponding or similar elements throughout the various figures:

FIG. 1C is a schematic diagram of a side view of a third example embodiment of an optical fiber coupler array, which comprises a plurality of VC waveguides, and a plurality of Non-VC waveguides, disposed longitudinally and asymmetrically to one another, and where at least a portion of the plural Non-VC waveguides are of different types and/or different characteristics;

FIG. 1D is a schematic diagram of a side view of a fourth example embodiment of an optical fiber coupler array, configured for fan-in and fan-out connectivity and comprising a pair of optical fiber coupler components with a multi-core optical fiber element connected between the second (smaller sized) ends of the two optical fiber coupler components;

FIG. 2C is a schematic diagram of a side view of a seventh example embodiment of an optical fiber coupler array, which comprises a plurality of longitudinally proximal VC waveguides at least partially embedded in a single common housing structure, wherein each plural VC waveguide is spliced, at a particular third splice location, to a corresponding elongated optical device (such as an optical fiber), at least a portion of which extends outside the single common housing structure by a predetermined length, and wherein each particular third splice location is disposed outside the single common housing structure;

FIG. 2D is a schematic diagram of a side view of an alternative embodiment of an optical fiber coupler array, comprising a plurality of longitudinally proximal VC waveguides at least partially embedded in a single common housing structure, that is configured at its second end, to increase, improve, and/or optimize optical coupling to a free-space-based optical device, wherein a free-space-based device may include (1) a standalone device, e.g., a lens followed by other optical components as shown in FIG. 2D, or (2) a device, which is fusion spliceable to the second coupler's end, e.g. a coreless glass element, which can serve as an end cup for power density redaction at the glass-air interface, or as a Talbot mirror for phase synchronization of coupler's waveguides in a Talbot cavity geometry;

DETAILED DESCRIPTION

Figure 8:
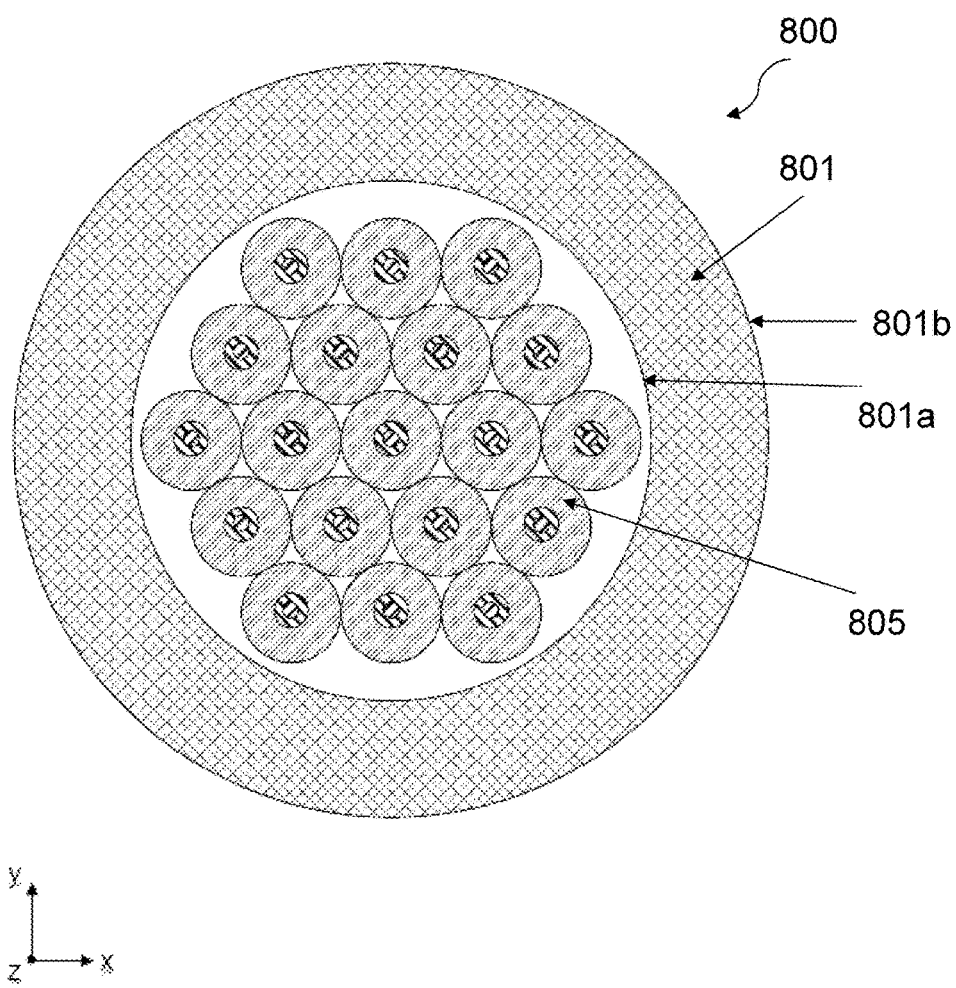
FIG. 8 is a schematic diagram of a cross-sectional view of an example configuration of the housing structure at a proximity to a first end of the optical coupler array. The cross-sectional view is orthogonal to the longitudinal direction or length of the optical coupler array.

Improved cross sectional (or transverse) positioning of waveguides is desirable in many multichannel optical coupler arrays. In the present disclosure, some embodiments of the housing structure (e.g., a common single coupler housing structure in some cases) can allow for self-aligning waveguide arrangement at a close proximity to a first end (e.g., hexagonal close packed arrangement in a housing structure having circular (as shown in FIG. 8) or hexagonal inner cross section) and improved (precise or near precise in some cases) cross sectional positioning of the waveguides at a second end.

Packaging of photonic integrated circuits (PICs) with low vertical profile (perpendicular to the PIC plane) can also be desirable for a variety of applications, including optical communications and sensing. While this is easily achievable for edge couplers, surface couplers may require substantial vertical length.

Accordingly, it may be advantageous to provide various embodiments of a pitch reducing optical fiber array (PROFA)-based flexible optical fiber array component that may be configured and possibly optimized to comprise a structure that maintains all channels discretely with sufficiently low crosstalk, while providing enough flexibility to accommodate low profile packaging. It may further be desirable to provide a PROFA-based flexible optical fiber array component comprising a flexible portion to provide mechanical isolation of a "PROFA-PIC interface" from the rest of the PROFA, resulting in increased stability with respect to environmental fluctuations, including temperature variations and mechanical shock and vibration. It may be additionally desirable to provide a PROFA-based flexible optical fiber array comprising multiple coupling arrays, each having multiple optical channels, combined together to form an optical multi-port input/output (IO) interface.

Certain embodiments are directed to an optical fiber coupler array capable of providing a low-loss, high-coupling coefficient interface with high accuracy and easy alignment between a plurality of optical fibers (or other optical devices) with a first channel-to-channel spacing, and an optical device having a plurality of waveguide interfaces with a second, smaller channel-to-channel spacing. Advantageously, in various embodiments, each of a larger size end and a smaller size end of the optical fiber coupler array is configurable to have a correspondingly different (i.e., larger vs. smaller) channel-to-channel spacing, where the respective channel-to-channel spacing at each of the optical coupler array's larger and smaller ends may be readily matched to a corresponding respective first channel-to-channel spacing of the plural optical fibers at the larger optical coupler array end, and to a second channel-to-channel spacing of the optical device plural waveguide interfaces at the smaller optical coupler array end.

In various embodiments thereof, the optical coupler array includes a plurality of waveguides (at least one of which may optionally be polarization maintaining), that comprises at least one gradually reduced "vanishing core fiber", at least in part embedded within a common housing structure. Alternatively, in various additional embodiments thereof, the coupler array may be configured for utilization with at least one of an optical fiber amplifier and an optical fiber laser.

Each of the various embodiments of the optical coupler array advantageously comprises at least one "vanishing core" (VC) fiber waveguide, described, for example, below in connection with a VC waveguide 30A of the optical coupler array 10A of FIG. 1A.

It should also be noted that the term "optical device" as generally used herein, applies to virtually any single channel or multi-channel optical device, or to any type of optical fiber, including, but not being limited to, standard/conventional optical fibers. For example, optical devices with which the coupler array may advantageously couple may include, but are not limited to, one or more of the following:

- a free-space-based optical device,
- an optical circuit having at least one input/output edge coupling port,
- an optical circuit having at least one optical port comprising vertical coupling elements,
- a multi-mode (MM) optical fiber,
- a double-clad optical fiber,
- a multi-core (MC) optical fiber,
- a large mode area (LMA) fiber,
- a double-clad multi-core optical fiber,
- a standard/conventional optical fiber,
- a custom optical fiber, and/or
- an additional optical coupler array.

In addition, while the term "fusion splice" is utilized in the various descriptions of the example embodiments of the coupler array provided below, in reference to interconnections between various optical coupler array components, and connections between various optical coupler array components and optical device(s), it should be noted, that any other form of waveguide or other coupler array component connectivity technique or methodology may be readily selected and utilized as a matter of design choice or necessity, without departing from the spirit of the invention, including but not limited to mechanical connections.

Figure 1A:
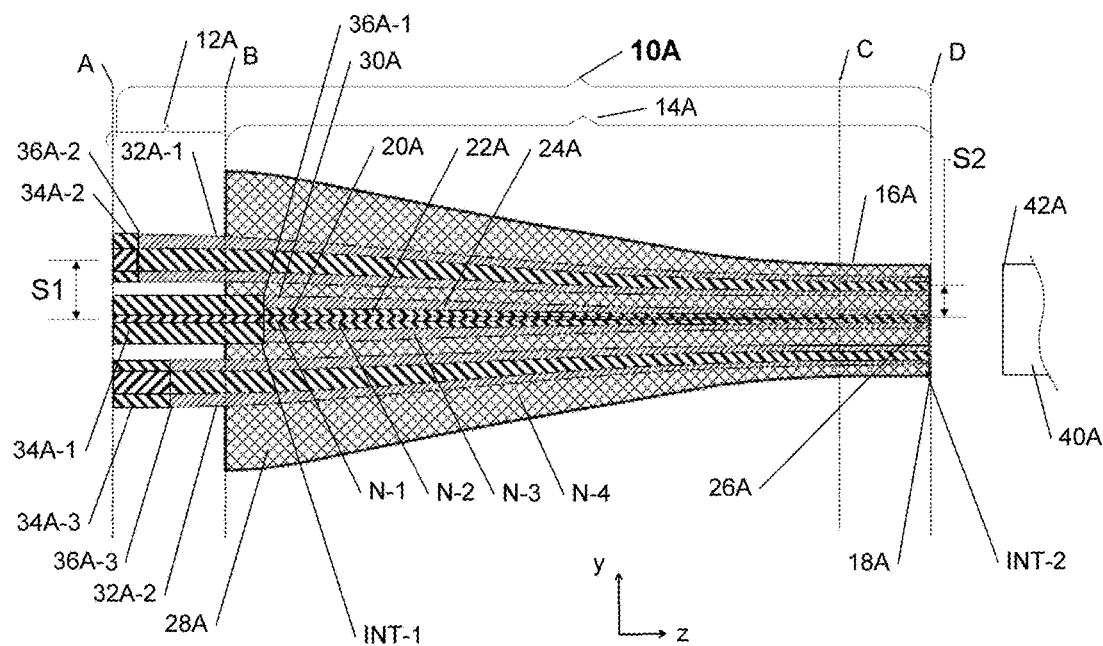
FIG. 1A is a schematic diagram of a side view of a first example embodiment of an optical fiber coupler array, which comprises at least one vanishing core waveguide (VC waveguide), illustrated therein by way of example as a single VC waveguide, and at least one Non-VC waveguide, illustrated therein by way of example as a plurality of Non-VC waveguides, disposed symmetrically proximally to the example single VC waveguide.

Referring now to FIG. 1A, a first example embodiment of an optical fiber coupler array is shown as an optical coupler array 10A, which comprises a common housing structure 14A (described below), at least one VC waveguide, shown in FIG. 1A by way of example, as a single VC waveguide 30A, and at least one Non-VC waveguide, shown in FIG. 1A by way of example, as a pair of Non-VC waveguides 32A-1, 32A-2, each positioned symmetrically proximally to one of the sides of the example single VC waveguide 30A, wherein the section of the VC waveguide 30A, located between positions B and D of FIG. 1A is embedded in the common housing structure 14A.

Before describing the coupler array 10A and its components in greater detail, it would be useful to provide a detailed overview of the VC waveguide 30A, the example embodiments and alternative embodiments of which, are advantageously utilized in each of the various embodiments of the coupler arrays of FIGS. 1A to 5.

The VC waveguide 30A has a larger end (proximal to position B shown in FIG. 1A), and a tapered, smaller end (proximal to position C shown in FIG. 1A), and comprises an inner core 20A (comprising a material with an effective refractive index of N-1), an outer core 22A (comprising a material with an effective refractive index of N-2, smaller than N-1), and a cladding 24A (comprising a material with an effective refractive index of N-3, smaller than N-2).

Advantageously, the outer core 22A serves as the effective cladding at the VC waveguide 30A large end at which the VC waveguide 30A supports "M1" spatial propagating modes within the inner core 20A, where M1 is larger than 0. The indices of refraction N-1 and N-2, are preferably chosen so that the numerical aperture (NA) at the VC waveguide 30A large end matches the NA of an optical device (e.g. an optical fiber) to which it is connected (such as an optical device 34A-1, for example, comprising a standard/conventional optical fiber connected to the VC waveguide 30A at a connection position 36A-1 (e.g., by a fusion splice, a mechanical connection, or by other fiber connection designs), while the dimensions of the inner and outer cores (20A, 22A), are preferably chosen so that the connected optical device (e.g., the optical device 34A-1), has substantially the same mode field dimensions (MFD). Here and below we use mode field dimensions instead of commonly used mode field diameter (also MFD) due to the case that the cross section of the VC or Non-VC waveguides may not be circular, resulting in a non-circular mode profile. Thus, the mode field dimensions include both the mode size and the mode shape and equal to the mode field diameter in the case of a circularly symmetrical mode.

During fabrication of the coupler array 10A from an appropriately configured preform (comprising the VC waveguide 30A preform having the corresponding inner and outer cores 20A, 22A, and cladding 24A), as the coupler array 10A preform is tapered in accordance with at least one predetermined reduction profile, the inner core 20A becomes too small to support all M1 modes. The number of spatial modes, supported by the inner core at the second (tapered) end is M2, where M2<M1. In the case of a single mode waveguide, where M1=1 (corresponding to 2 polarization modes), M2=0, meaning that inner core is too small to support light propagation. The VC waveguide 30A then acts as if comprised a fiber with a single core of an effective refractive index close to N-2, surrounded by a cladding of lower index N-3.

During fabrication of the coupler array 10A, a channel-to-channel spacing S-1 at the coupler array 10A larger end (at position B, FIG. 1A), decreases in value to a channel-to-channel spacing S-2 at the coupler array 10A smaller end (at position C, FIG. 1A), in proportion to a draw ratio selected for fabrication, while the MFD value (or the inversed NA value of the VC waveguide 30A) can be either reduced, increased or preserved depending on a selected differences in refractive indices, (N-1–N-2) and (N-2–N-3), which depends upon the desired application for the optical coupler array 10A, as described below.

The capability of independently controlling the channel-to-channel spacing and the MFD values at each end of the optical coupler array is a highly advantageous feature of certain embodiments. Additionally, the capability to match MFD and NA values through a corresponding selection of the sizes and shapes of inner 20A and outer 22A cores and values of N-1, N-2, and N-3, makes it possible to utilize the optical coupler array to couple to various waveguides without the need to use a lens.

In various embodiments thereof, the property of the VC waveguide permitting light to continue to propagate through the waveguide core along the length thereof when its diameter is significantly reduced, advantageously, reduces optical loss from interfacial imperfection or contamination, and allows the use of a wide range of materials for a medium 28A of the common housing structure 14A (described below), including, but not limited to:
(a) non-optical materials (since the light is concentrated inside the waveguide core),
(b) absorbing or scattering materials or materials with refractive index larger than the refractive index of standard/conventional fibers for reducing or increasing the crosstalk between the channels, and
(c) pure-silica (e.g., the same material as is used in most standard/conventional fiber claddings, to facilitate splicing to multi-core, double-clad, or multi-mode fiber.

Preferably, in accordance with certain embodiments, the desired relative values of NA-1 and NA-2 (each at a corresponding end of the coupler array 10A, for example, NA-1 corresponding to the coupler array 10A large end, and NA-2 corresponding to the coupler array 10A small end), and, optionally, the desired value of each of NA-1 and NA-2), may be determined by selecting the values of the refractive indices N1, N2, and N3 of the coupler array 10A, and configuring them in accordance with at least one of the following relationships, selected based on the desired relative numerical aperture magnitudes at each end of the coupler array 10A:

| Desired NA-1/NA-2 Relative Magnitude | Corresponding Relationship bet. N1, N2, N3 |
| --- | --- |
| NA-1 (lrg. end) > NA-2 (sm. end) | (N1-N2 > N2-N3) |
| NA-1 (lrg. end) = NA-2 (sm. end) | (N1-N2 = N2-N3) |
| NA-1 (lrg. end) < NA-2 (sm. end) | (N1-N2 < N2-N3) |

Commonly the NA of any type of fiber is determined by the following expression:

$$NA = \sqrt{n_{core}^2 - n_{clad}^2},$$

where $n_{core}$ and $n_{clad}$ are the refractive indices of fiber core and cladding respectively.

It should be noted that when the above expression is used, the connection between the NA and the acceptance angle of the fiber is only an approximation. In particular, fiber manufacturers often quote "NA" for single-mode (SM) fibers based on the above expression, even though the acceptance angle for a single-mode fiber is quite different and cannot be determined from the indices of refraction alone.

In accordance with certain embodiments, as used herein, the various NA values are preferably determined utilizing effective indices of refraction for both $n_{core}$ and $n_{cladding}$, because the effective indices determine the light propagation and are more meaningful in the case of structured waveguides utilized in various embodiments. Also, a transverse refractive index profile inside a waveguide may not be flat, but rather varying around the value N1, N2, N3, or N4. In addition, the transition between regions having refractive indices N1, N2, N3, and N4 may not be as sharp as a step function due to dopant diffusion or some other intentional or non-intentional factors, and may be a smooth function, connecting the values of N1, N2, N3, and N4. Coupling design or optimization may involve changing both the values of N1, N2, N3, and N4 and the sizes and shapes of the regions having respective indices.

Returning now to FIG. 1A, the common coupling structure 14A, comprises the medium 28A, in which the section of the VC waveguide 30A located between positions B and D of FIG. 1A is embedded, and which may include, but is not limited to, at least one of the following materials:

a material, having properties prohibiting propagation of light therethrough,
a material having light-absorbing optical properties,
a material having light scattering optical properties,
a material having optical properties selected such that said fourth refractive index (N-4) is greater than said third refractive index (N-3), and/or
a material having optical properties selected such that said fourth refractive index (N-4) is substantially equal to said third refractive index (N-3).

At the optical coupler array 10A large end (proximally to position B in FIG. 1A), the VC waveguide 30A is spliced, at a particular splice location 36A-1 (shown by way of example as positioned inside the common housing structure 14A), to a corresponding respective elongated optical device 34A-1 (for example, such as an optical fiber), at least a portion of which extends outside the common housing structure 14A by a predetermined length 12A, while the Non-VC waveguides 32A-1, 32A-2 are spliced, at particular splice locations 36A-2, 36A-3, respectively (disposed outside of the common housing structure 14A), to corresponding respective elongated optical devices 34A-2, 34A-3 (such as optical fibers), and extending outside the common housing structure 14A by a predetermined length 12A.

Optionally, the coupler array 10A may also include a substantially uniform diameter tip 16A (shown between positions C and D in FIG. 1A) for coupling, at an array interface 18A with the interface 42A of an optical waveguide device 40A. The uniform diameter tip 16A may be useful in certain interface applications, such as for example shown in FIGS. 1D, 4 and 5. Alternatively, the coupler array 10A may be fabricated without the tip 16A (or have the tip 16A removed after fabrication), such that coupling with the optical device interface 42A, occurs at a coupler array 10A interface at position C of FIG. 1A.

In an alternative embodiment, if the optical device 40A comprises a double-clad fiber, when the small end of the coupler array 10A is coupled (for example, fusion spliced) to the optical device interface 42A, at least a portion of the common housing structure 14A proximal to the splice position (such as at least a portion of the tip 16A), may be coated with a low index medium (not shown), extending over the splice position and up to the double-clad fiber optical device 40A outer cladding (and optionally extending over a portion of the double-clad fiber optical device 40A outer cladding that is proximal to the splice position).

Figure 1B:
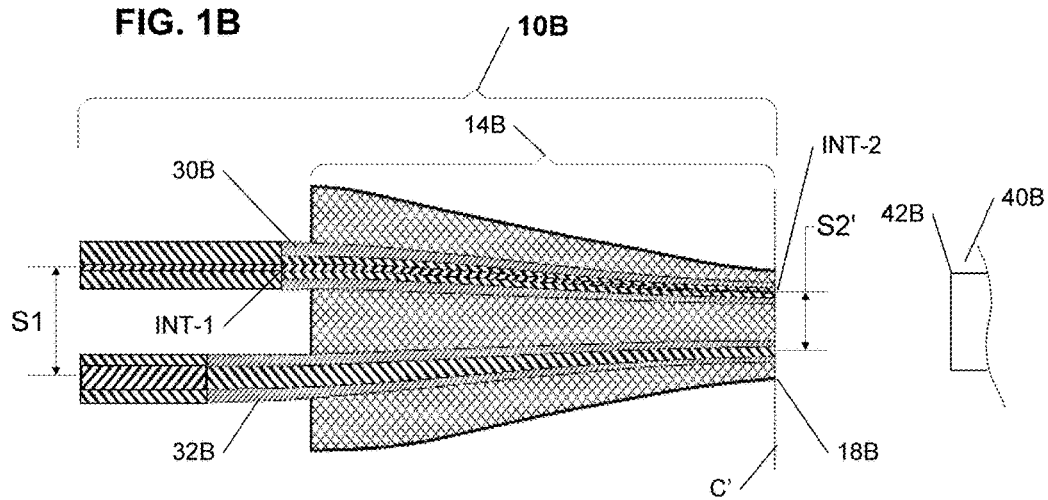
FIG. 1B is a schematic diagram of a side view of a second example embodiment of an optical fiber coupler array, which comprises at least one vanishing core waveguide (VC waveguide), illustrated therein by way of example as a single VC waveguide, and at least one Non-VC waveguide, illustrated therein by way of example as a single Non-VC waveguide, disposed in parallel proximity to the example single VC waveguide, where a portion of the optical fiber coupler array has been configured to comprise a higher channel-to-channel spacing magnitude at its second (smaller) end than the corresponding channel-to-channel spacing magnitude at the second end of the optical fiber coupler array of FIG. 1A.

Referring now to FIG. 1B, a second example embodiment of the optical fiber coupler array, is shown as a coupler array 10B. The coupler array 10B comprises a common housing structure 14B, at least one VC waveguide, shown in FIG. 1B by way of example, as a single VC waveguide 30B, and at least one Non-VC waveguide, shown in FIG. 1B by way of example, as a single Non-VC waveguide 32B, disposed in parallel proximity to the VC waveguide 30B, where a portion of the optical coupler array 10B, has been configured to comprise a larger channel-to-channel spacing value S2' at its small end, than the corresponding channel-to-channel spacing value S2 at the small end of the optical coupler array 10A, of FIG. 1A. This configuration may be readily implemented by transversely cutting the optical fiber array 10A at a position C', thus producing the common housing structure 14B that is shorter than the common housing structure 14A and resulting in a new, larger diameter array interface 18B, having the larger channel-to-channel spacing value S2'.

Referring now to FIG. 1C, a third example embodiment of the optical fiber coupler array, is shown as a coupler array 10C. The coupler array 10C comprises a plurality of VC waveguides, shown in FIG. 1C as VC waveguides 30C-1, and 30C-2, and a plurality of Non-VC waveguides, shown in FIG. 1C as Non-VC waveguides 32C-1, 32C-2, and 32C-a, all disposed longitudinally and asymmetrically to one another, wherein at least a portion of the plural Non-VC waveguides are of different types and/or different characteristics (such as single mode or multimode or polarization maintaining etc.)—for example, Non-VC waveguides 32C-1, 32C-2 are of a different type, or comprise different characteristics from the Non-VC waveguide 32C-a. Additionally, any of the VC or Non-VC waveguides (such as, for example, the Non-VC waveguide 32C-a) can readily extend beyond the coupler array 10C common housing structure by any desired length, and need to be spliced to an optical device proximally thereto.

Referring now to FIG. 1D, a fourth example embodiment of the optical fiber coupler array that is configured for multi-core fan-in and fan-out connectivity, and shown as a coupler array 50. The coupler array 50 comprises a pair of optical fiber coupler array components (10D-1 and 10D-2), with a multi-core optical fiber element 52 connected (e.g., by fusion splicing at positions 54-1 and 54-2) between the second (smaller sized) ends of the two optical fiber coupler array components (10D-1, 10D-2). Preferably, at least one of the VC waveguides in each of the coupler array components (10D-1, 10D-2) is configured to increase or maximize optical coupling to a corresponding selected core of the multi-core optical fiber element 52, while decreasing or minimizing optical coupling to all other cores thereof.

Figure 2A:
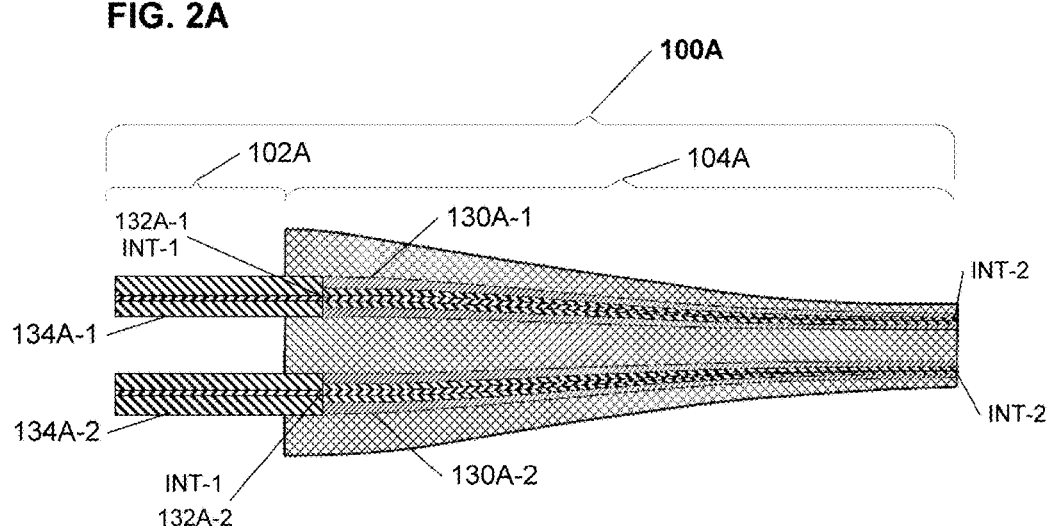
FIG. 2A is a schematic diagram of a side view of a fifth example embodiment of an optical fiber coupler array, which comprises a plurality of longitudinally proximal VC waveguides at least partially embedded in a single common housing structure, wherein each plural VC waveguide is spliced, at a particular first splice location, to a corresponding elongated optical device (such as an optical fiber), at least a portion of which extends outside the single common housing structure by a predetermined length, and wherein each particular first splice location is disposed within the single common housing structure.

Referring now to FIG. 2A, a fifth example embodiment of the optical fiber coupler array, is shown as a coupler array 100A. The coupler array 100A comprises a plurality of longitudinally proximal VC waveguides at least partially embedded in a single common housing structure 104A, shown by way of example only, as plural VC waveguides 130A-1, 130A-2. Each plural VC waveguide 130A-1, 130A-2 is spliced, at a particular splice location 132A-1, 132A-2, respectively, to a corresponding respective elongated optical device 134A-1, 134A-2 (such as an optical fiber), at least a portion of which extends outside the common housing structure 104A by a predetermined length 102A, and wherein each particular splice location 132A-1, 132A-2 is disposed within the common housing structure 104A.

Figure 2B:
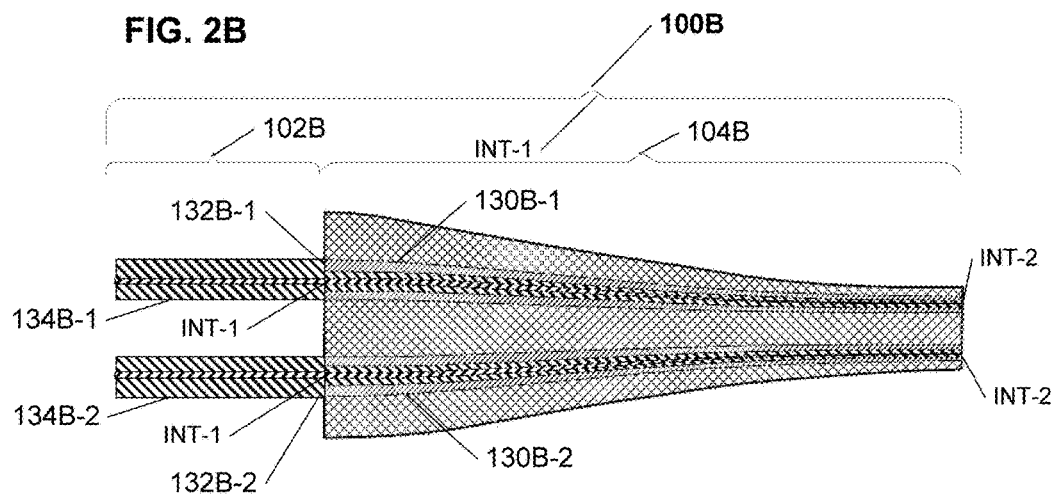
FIG. 2B is a schematic diagram of a side view of a sixth example embodiment of an optical fiber coupler array, which comprises a plurality of longitudinally proximal VC waveguides at least partially embedded in a single common housing structure, wherein each plural VC waveguide is spliced, at a particular second splice location, to a corresponding elongated optical device (such as an optical fiber), at least a portion of which extends outside the single common housing structure by a predetermined length, and wherein each particular second splice location is disposed at an outer cross-sectional boundary region of the single common housing structure.

Referring now to FIG. 2B, a sixth example embodiment of the optical fiber coupler array, is shown as a coupler array 100B.

The coupler array 100B comprises a plurality of longitudinally proximal VC waveguides at least partially embedded in a single common housing structure 104B, shown by way of example only, as plural VC waveguides 130B-1, 130B-2. Each plural VC waveguide 130B-1, 130B-2 is spliced, at a particular splice location 132B-1, 132B-2, respectively, to a corresponding respective elongated optical device 134B-1, 134B-2 (such as an optical fiber), at least a portion of which extends outside the common housing structure 104B by a predetermined length 102B, and wherein each particular splice location 132B-1, 132B-2 is disposed at an outer cross-sectional boundary region of the common housing structure 104B.

Referring now to FIG. 2C, a seventh example embodiment of the optical fiber coupler array, is shown as a coupler array 100C.

The coupler array 100C comprises a plurality of longitudinally proximal VC waveguides at least partially embedded in a single common housing structure 104C, shown by way of example only, as plural VC waveguides 130C-1, 130C-2. Each plural VC waveguide 130C-1, 130C-2 is spliced, at a particular splice location 132C-1, 132C-2, respectively, to a corresponding respective elongated optical device 134C-1, 134C-2 (such as an optical fiber), at least a portion of which extends outside the common housing structure 104C by a predetermined length 102C, and wherein each particular splice location 132C-1, 132C-2 is disposed outside of the common housing structure 104C.

Referring now to FIG. 2D, an alternative embodiment of the optical fiber coupler array, is shown as a coupler array 150. The coupler array 150 comprises a plurality of longitudinally proximal VC waveguides at least partially embedded in a single common housing structure, that is configured at its second end, to increase or optimize optical coupling to a free-space-based optical device 152. The free-space-based optical device 152 may comprise a lens 154 followed by an additional optical device component 156, which may comprise, by way of example, a MEMS mirror or volume Bragg grating. The combination of the coupler and the free-space-based optical device 152 may be used as an optical switch or WDM device for spectral combining or splitting of light signals 160b (representative of the light coupler array 150 output light signals 160a after they have passed through the lens 154.) In this case, one of the fibers may be used as an input and all others for an output or vice versa. In another embodiment, a free-space-based device 152 can be fusion spliceable to the second coupler's end. This device may be a coreless glass element, which can serve as an end cup for power density redaction at the glass-air interface. In another modification, the coreless element can serve as a Talbot mirror for phase synchronization of coupler's waveguides in a Talbot cavity geometry Prior to describing the various embodiments shown in FIGS. 3A to 3L in greater detail, it should be understood that whenever a "plurality" or "at least one" coupler component/element is indicated below, the specific quantity of such coupler components/elements that may be provided in the corresponding embodiment of the coupler array, may be selected as a matter of necessity, or design choice (for example, based on the intended industrial application of the coupler array), without departing from the spirit of the present invention. Accordingly, in the various FIGS. 3A to 3L, single or individual coupler array components/elements are identified by a single reference number, while each plurality of the coupler component/elements is identified by a reference number followed by a "(1 . . . n)" designation, with "n" being a desired number of plural coupler elements/components (and which may have a different value in any particular coupler array embodiment described below).

Also, all the waveguides VC and Non-VC are shown with a circular cross-section of the inner and outer core and cladding only by example. Other shapes of the cross-sections of the inner and outer core and cladding (for example, hexagonal, rectangular or squared) may be utilized without departure from the current invention. The specific choice of shape is based on various requirements, such as channel shape of the optical device, channel positional geometry (for example, hexagonal, rectangular or square lattice), or axial polarization alignment mode.

Similarly, unless otherwise indicated below, as long as various relationships set forth below (for example, the relative volume relationship set forth below with respect to optical coupler arrays 200C and 200D of FIGS. 3C and 3D, respectively, and the feature, set forth below in connection with the coupler array 200H of FIG. 3H, that the PM VC waveguide 204H is positioned longitudinally off-centered transversely from the coupler array 200H central longitudinal axis), are adhered to, the sizes, relative sizes, relative positions and choices of composition materials, are not limited to the example sizes, relative sizes, relative positions and choices of composition materials, indicated below in connection with the detailed descriptions of the coupler array embodiments of FIGS. 3A to 3L, but rather they may be selected by one skilled in the art as a matter of convenience or design choice, without departing from the spirit of the present invention.

Finally, it should be noted that each of the various single common housing structure components 202A to 202L, of the various coupler arrays 200A to 200L of FIGS. 3A to 3L, respectively, may be composed of a medium having the refractive index N-4 value in accordance with an applicable one of the above-described relationships with the values of other coupler array component refractive indices N-1, N-2, and N-3, and having properties and characteristics selected from the various contemplated example medium composition parameters described above in connection with medium 28A of FIG. 1A.

Figure 3A:
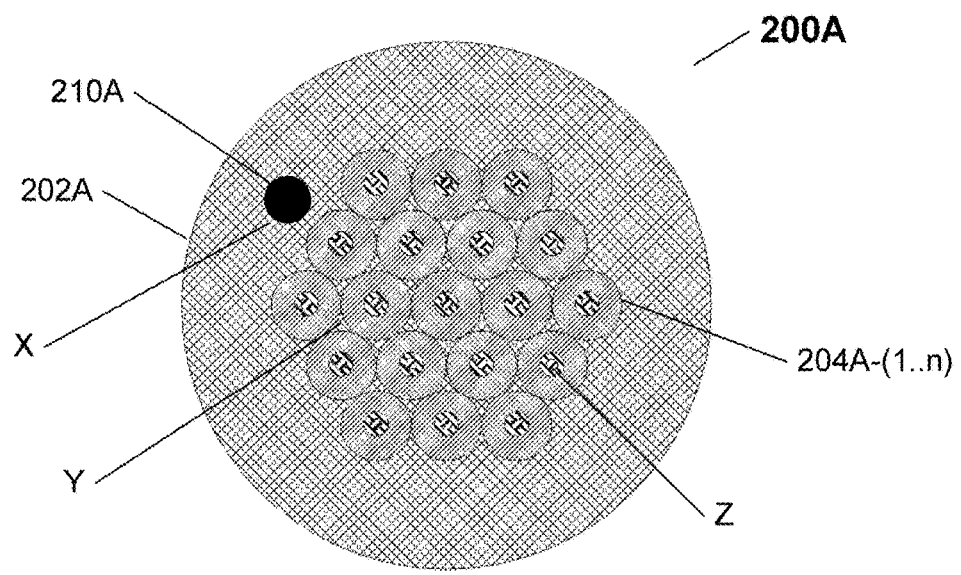
FIG. 3A is a schematic diagram of a cross-sectional view of a first alternative embodiment of the optical fiber coupler arrays of FIGS. 1D to 2D, above, and optionally comprising a fiducial element operable to provide a visual identification of waveguide arrangement/characteristics (such as alignment), which may be disposed in one of several categories of cross-sectional regions.

Referring now to FIG. 3A, a first alternative embodiment of the optical fiber coupler array embodiments of FIGS. 1D to 2D, is shown as a coupler array 200A in which all waveguides are VC waveguides. The coupler array 200A comprises a single common housing 202A, and plurality of VC waveguides 204A-(1 . . . n), with n being equal to 19 by way of example only, disposed centrally along the central longitudinal axis of the housing 202A. The coupler array 200A may also comprise an optional at least one fiducial element 210A, operable to provide one or more useful properties to the coupler array, including, but not limited to:

enabling visual identification (at at least one of the coupler array's ends) of the coupler array waveguide arrangement; and facilitating passive alignment of at least one of the coupler array ends to at least one optical device.

Furthermore, when deployed in optical coupler array embodiments that comprise at least one polarization maintaining VC waveguide (such as the optical coupler array embodiments described below in connection with FIGS. 3H-3L), a fiducial element is further operable to:

enable visual identification of the optical coupler array's particular polarization axes alignment mode (such as described below in connection with FIGS. 3H-3L); and serve as a geometrically positioned reference point for alignment thereto, of one or more polarization axis of PM waveguides in a particular optical coupler array.

The fiducial element 210A may comprise any of the various types of fiducial elements known in the art, selected as a matter of design choice or convenience without departing from the spirit of the invention—for example, it may be a dedicated elongated element positioned longitudinally within the common housing structure 202A in one of various cross-sectional positions (such as positions X or Y, shown in FIG. 3A. Alternatively, the fiducial element 210A may comprise a dedicated channel not used for non-fiducial purposes, for example, replacing one of the waveguides 204A-(1 . . . n), shown by way of example only at position Z in FIG. 3A.

Figure 3B:
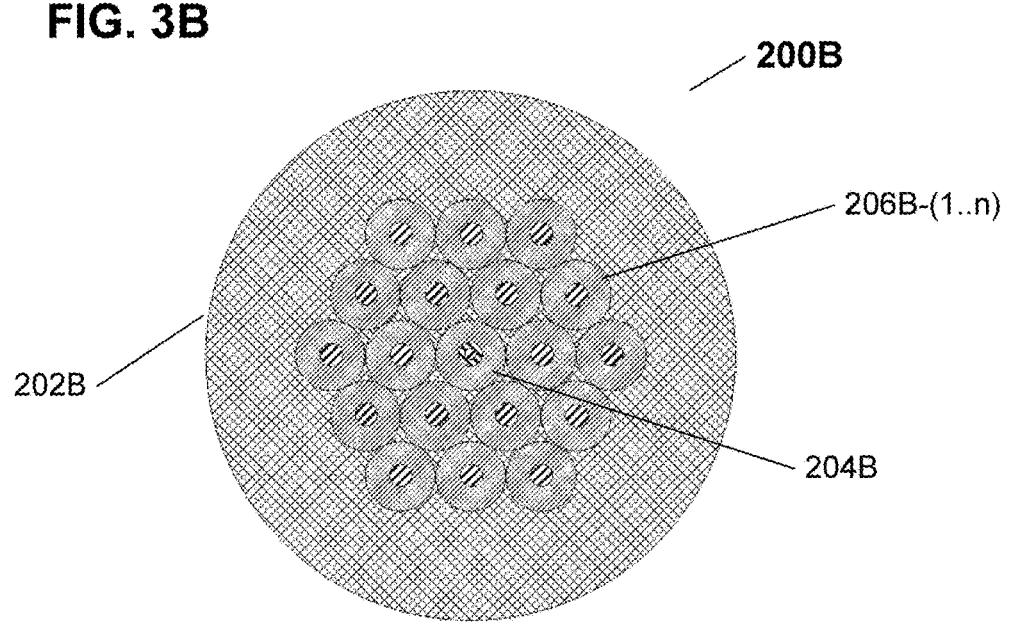
FIG. 3B is a schematic diagram of a cross-sectional view of a first alternative embodiment of the optical fiber coupler array of FIG. 1A, above, in which at least one VC waveguide, illustrated therein by way of example as a single VC waveguide, is positioned along a central longitudinal axis of the single common housing structure, and surrounded by a plurality of parallel proximal symmetrically positioned Non-VC waveguides.

Referring now to FIG. 3B, a first alternative embodiment of the optical fiber coupler array 10A of FIG. 1A, above, is shown as a coupler array 200B, that comprises a single housing structure 202B, and at least one VC waveguide, shown in FIG. 3B by way of example as a VC waveguide 204B, and a plurality of Non-VC waveguides 206B-(1 . . . n), with n being equal to 18 by way of example only. The VC waveguide 204B is positioned along a central longitudinal axis of the common housing structure 202B, and circumferentially and symmetrically surrounded by proximal parallel plural Non-VC waveguides 206B-(1 . . . n).

Figure 3C:
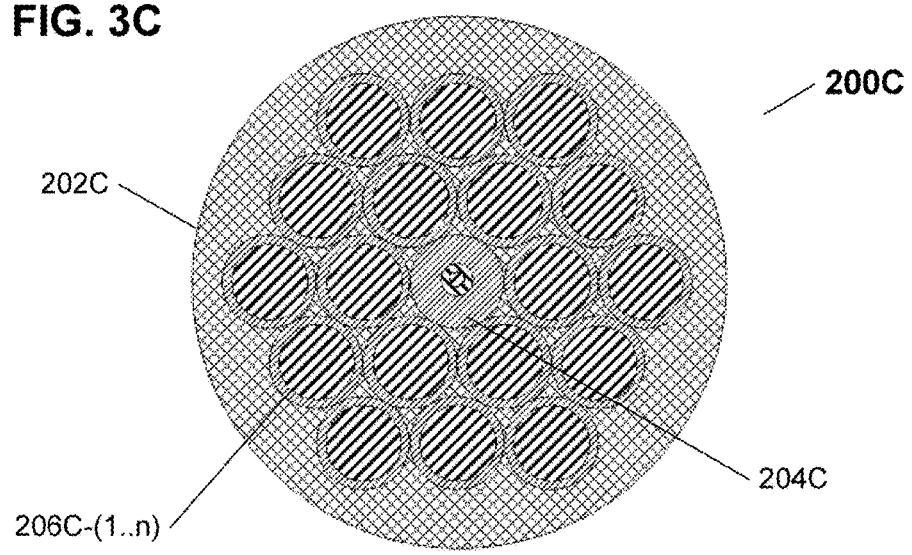
FIG. 3C is a schematic diagram of a cross-sectional view of a first alternative embodiment of the optical fiber coupler array of FIG. 3B above, in which a volume of the single common housing structure medium surrounding the sections of all of the waveguides embedded therein, exceeds a total volume of the inner and outer cores of the section of the VC waveguide that is embedded within the single common housing structure.

Referring now to FIG. 3C, a first alternative embodiment of the optical fiber coupler array 200B of FIG. 3B, above, is shown as a coupler array 200C that comprises a single housing structure 202C, a VC waveguide 204C, and a plurality of Non-VC waveguides 206C-(1 . . . n), with n being equal to 18 by way of example only. The VC waveguide 204C is positioned along a central longitudinal axis of the common housing structure 202C, and circumferentially and symmetrically surrounded by proximal parallel plural Non-VC waveguides 206C-(1 . . . n). The coupler array 200C is configured such that a volume of the common housing structure 202C medium, surrounding the sections of all of the waveguides embedded therein (i.e., the VC waveguide 204C and the plural Non-VC waveguides 206C-(1 . . . n)), exceeds a total volume of the inner and outer cores of the section of the VC waveguide 204C that is embedded within the single common housing structure 202C.

Figure 3D:
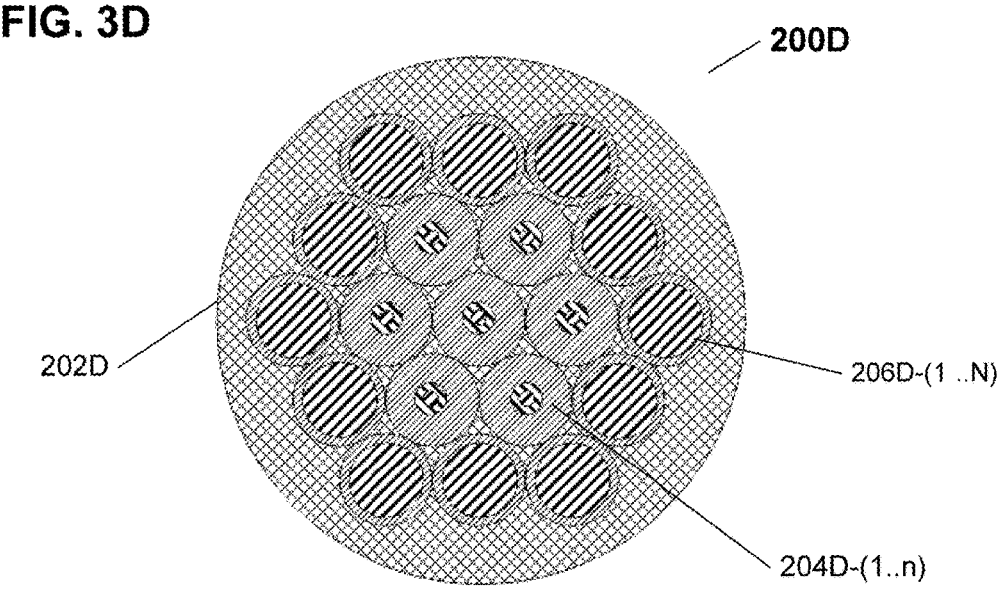
FIG. 3D is a schematic diagram of a cross-sectional view of a second alternative embodiment of the optical fiber coupler array of FIG. 3B above, in which the at least one VC waveguide positioned along the central longitudinal axis of the single common housing structure comprises a plurality of VC waveguides, and wherein a volume of the single common housing structure medium surrounding the sections of all of the waveguides embedded therein, exceeds a total volume of the inner and outer cores of the sections of the plural VC waveguides that are embedded within the single common housing structure.

Referring now to FIG. 3D, a first alternative embodiment of the optical fiber coupler array 200C of FIG. 3C, above, is shown as a coupler array 200D that comprises a single housing structure 202D, a plurality of VC waveguides 204D-(1 . . . N), with N being equal to 7 by way of example only, and a plurality of Non-VC waveguides 206D-(1 . . . n), with n being equal to 12 by way of example only. The plural VC waveguides 204D-(1 . . . N) are positioned along a central longitudinal axis of the common housing structure 202D, and circumferentially and symmetrically surrounded by proximal parallel plural Non-VC waveguides 206D-(1 . . . n). The coupler array 200D is configured such that a volume of the common housing structure 202D medium, surrounding the sections of all of the waveguides embedded therein (e.g., the plural VC waveguides 204D-(1 . . . N), and the plural Non-VC waveguides 206D-(1 . . . n)), exceeds a total volume of the inner and outer cores of the section of the plural VC waveguides 204D-(1 . . . N) that are embedded within the single common housing structure 202D.

Figure 3E:
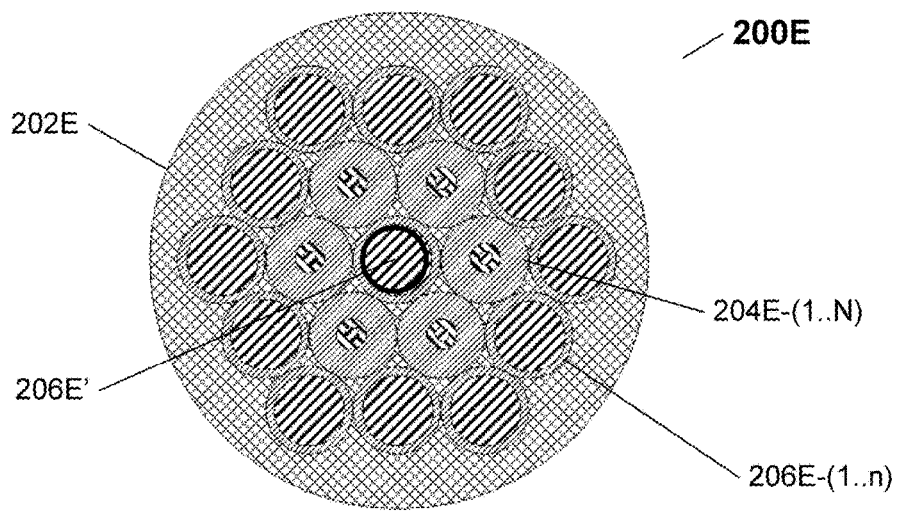
FIG. 3E is a schematic diagram of a cross-sectional view of a first alternative embodiment of the optical fiber coupler array of FIG. 3D, further comprising a central waveguide channel operable to provide optical pumping functionality therethrough.

Referring now to FIG. 3E, a first alternative embodiment of the optical fiber coupler array 200D of FIG. 3D, above, is shown as a coupler array 200E, that comprises a single housing structure 202E, a plurality of VC waveguides 204E-(1 . . . N), with N being equal to 6 by way of example only, a plurality of Non-VC waveguides 206E-(1 . . . n), with n being equal to 12 by way of example only, and a separate single Non-VC waveguide 206E'. The Non-VC waveguide 206E', is preferably operable to provide optical pumping functionality therethrough, and is positioned along a central longitudinal axis of the common housing structure 202E and circumferentially and symmetrically surrounded by proximal parallel plural VC waveguides 204E-(1 . . . N), that are in turn circumferentially and symmetrically surrounded by proximal parallel plural Non-VC waveguides 206E-(1 . . . n).

Figure 3F:
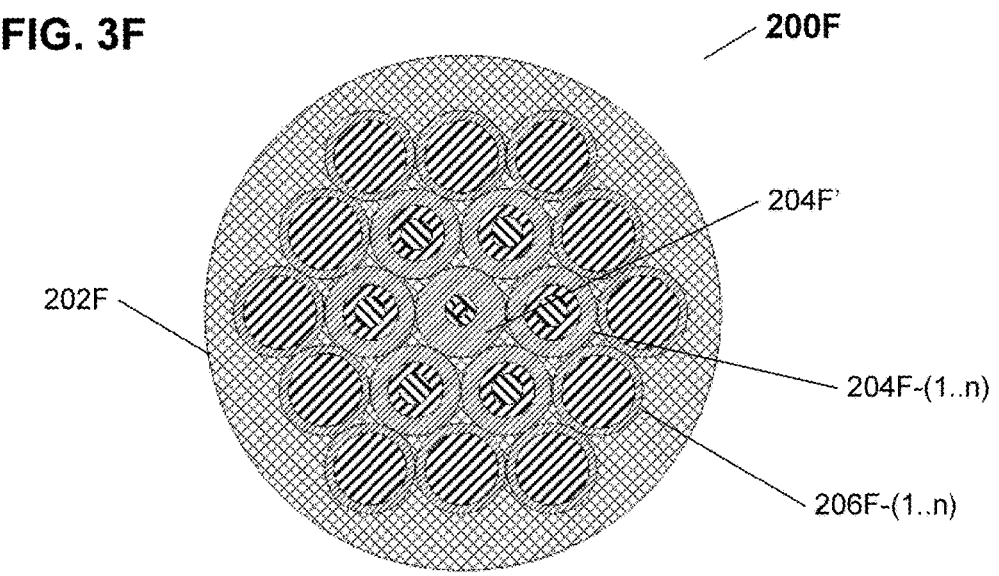
FIG. 3F is a schematic diagram of a cross-sectional view of a second alternative embodiment of the optical fiber coupler array of FIG. 3D, in which the VC waveguide that is positioned along the central longitudinal axis of the single common housing structure, is of a different type, and/or comprises different characteristics from the remaining plural VC waveguides, which, if selected to comprise enlarged inner cores, may be advantageously utilized for increasing or optimizing optical coupling to different types of optical pump channels of various optical devices.

Referring now to FIG. 3F, a second alternative embodiment of the optical fiber coupler array 200B of FIG. 3B, above, is shown as a coupler array 200F, that comprises a single housing structure 202F, a plurality of VC waveguides 204F-(1 . . . N), with N being equal to 6 by way of example only, a separate single VC waveguide 204F', and a plurality of Non-VC waveguides 206F-(1 . . . n), with n being equal to 12 by way of example only, that preferably each comprise enlarged inner cores of sufficient diameter to increase or optimize optical coupling to different types of optical pump channels of various optical devices, to which the coupler array 200F may be advantageously coupled. The VC waveguide 204F', is positioned along a central longitudinal axis of the common housing structure 202F, and circumferentially and symmetrically surrounded by proximal parallel plural VC waveguides 204F-(1 . . . N), that are in turn circumferentially and symmetrically surrounded by proximal parallel plural Non-VC waveguides 206F-(1 . . . n).

Figure 3G:
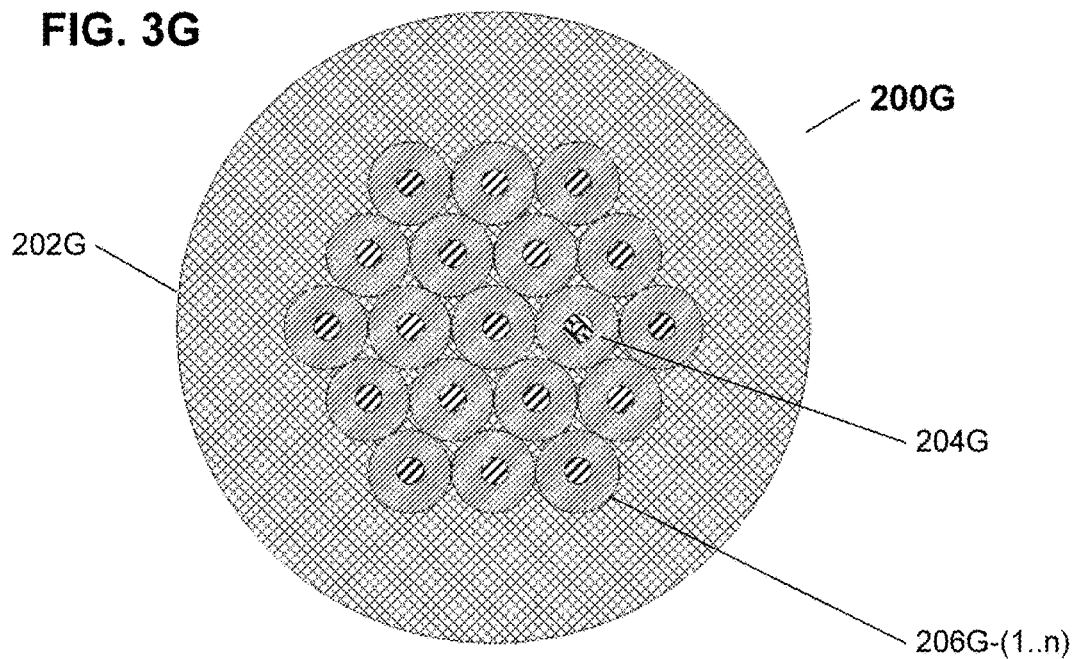
FIG. 3G is a schematic diagram of a cross-sectional view of a third alternative embodiment of the optical fiber coupler array of FIG. 3B above, in which at least one VC waveguide, illustrated therein by way of example as a single VC waveguide, is positioned as a side-channel, off-set from the central longitudinal axis of the single common housing structure, such that this embodiment of the optical fiber coupler array may be readily used as a fiber optical amplifier and or a laser, when spliced to a double-clad optical fiber having a non-concentric core for improved optical pumping efficiency.

Referring now to FIG. 3G, a third alternative embodiment of the optical fiber coupler array 200B of FIG. 3B, above, is shown as a coupler array 200G, that comprises a single housing structure 202G, and at least one VC waveguide, shown in FIG. 3G by way of example as a VC waveguide 204G, and a plurality of Non-VC waveguides 206G-(1 . . . n), with n being equal to 18 by way of example only. The VC waveguide 204G is positioned as a side-channel, off-set from the central longitudinal axis of the single common housing structure 202G, such that optical fiber coupler array 200G may be readily used as a fiber optical amplifier and or a laser, when spliced to a double-clad optical fiber (not shown) having a non-concentric core for improved optical pumping efficiency. It should be noted that because a double-clad fiber is a fiber in which both the core and the inner cladding have light guiding properties, most optical fiber types, such as SM, MM, LMA, or MC (multi-core), whether polarization maintaining or not, and even standard (e.g., conventional) single mode optical fibers, can be converted into a double-clad fiber by coating (or recoating) the fiber with a low index medium (forming the outer cladding).

Optionally, when the second end of the coupler array 200G is spliced to a double-clad fiber (not shown), at least a portion of the common housing structure 202G proximal to the splice point with the double-clad fiber (not-shown), may be coated with a low index medium extending over the splice point and up to the double-clad fiber's outer cladding (and optionally extending over a portion of the outer cladding that is proximal to the splice point).

Referring now to FIGS. 3H to 3L, in various alternative example embodiments of the optical coupler, at least one of the VC waveguides utilized therein, and, in certain embodiments, optionally at least one of the Non-VC waveguides, may comprise a polarization maintaining (PM) property. By way of example, the PM property of a VC waveguide may result from a pair of longitudinal stress rods disposed within the VC waveguide outside of its inner core and either inside, or outside, of the outer core (or through other stress elements), or the PM property may result from a noncircular inner or outer core shape, or from other PM-inducing optical fiber configurations (such as in bow-tie or elliptically clad PM fibers). In various embodiments of the optical fiber in which at least one PM waveguide (VC and/or Non-VC) is utilized, an axial alignment of the PM waveguides (or waveguide), in accordance with a particular polarization axes alignment mode may be involved.

Figure 3H:
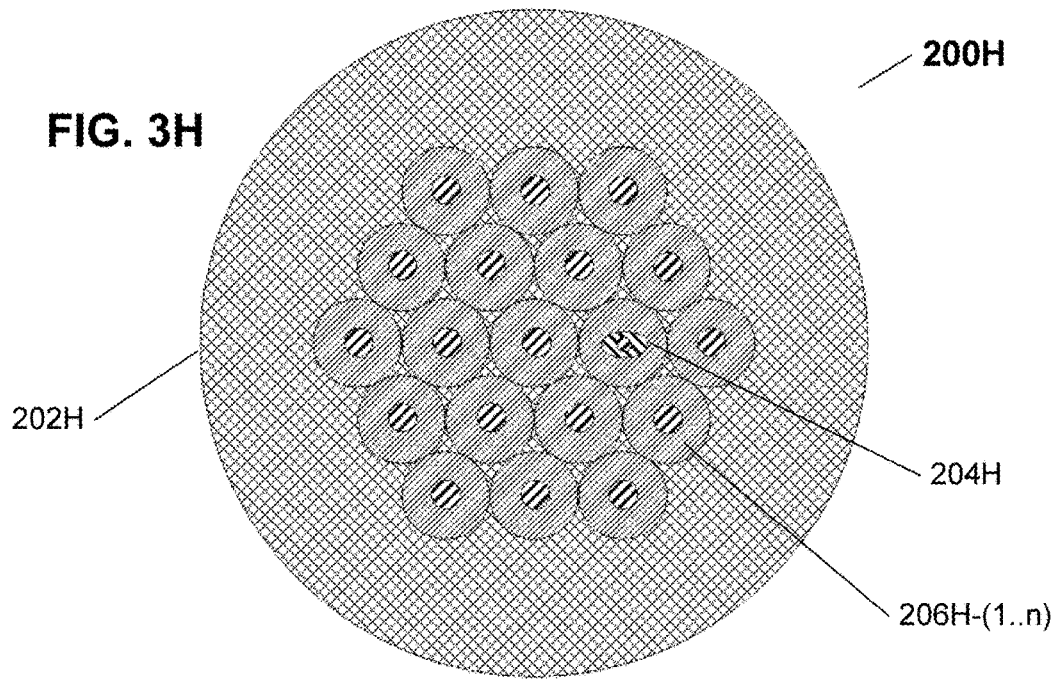
FIG. 3H is a schematic diagram of a cross-sectional view of a first alternative embodiment of the optical fiber coupler array of FIG. 3G, above, in which the at least one VC waveguide, illustrated therein by way of example as a side-channel off-center positioned single VC waveguide, comprises polarization maintaining properties and comprises a polarization axis that is aligned with respect to its transverse off-center location.
Figure 3I:
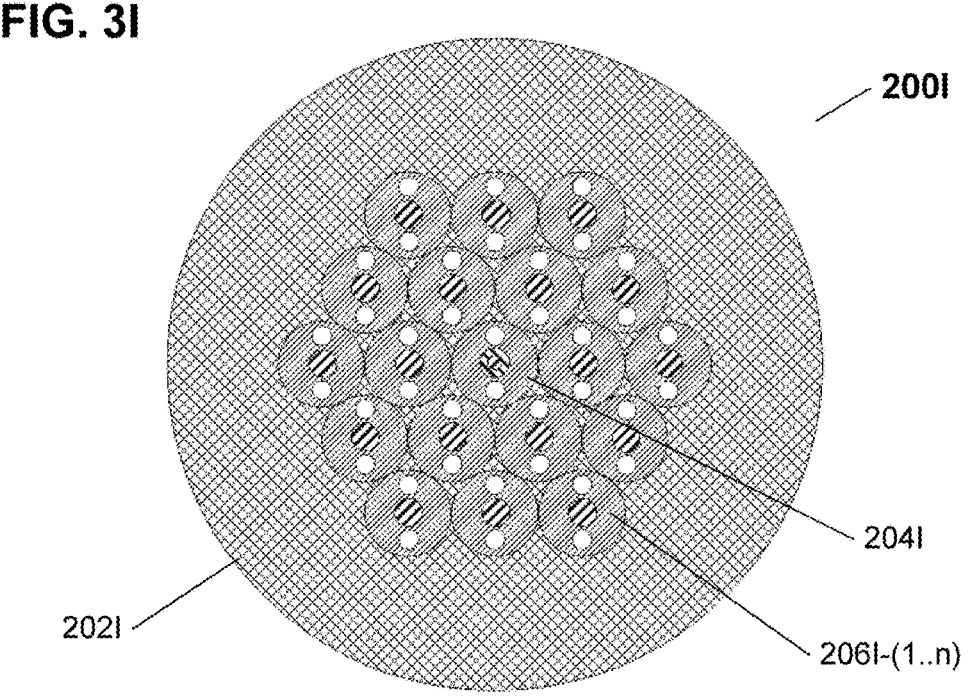
FIG. 3I is a schematic diagram of a cross-sectional view of a fourth alternative embodiment of the optical fiber coupler array of FIG. 3B, above, wherein each of the centrally positioned single VC waveguide, and the plural Non-VC waveguides, comprises polarization maintaining properties (shown by way of example only as being induced by rod stress members and which may readily and alternately be induced by various other stress or equivalent designs), and a corresponding polarization axis, where all of the polarization axes are aligned to one another.
Figure 3J:
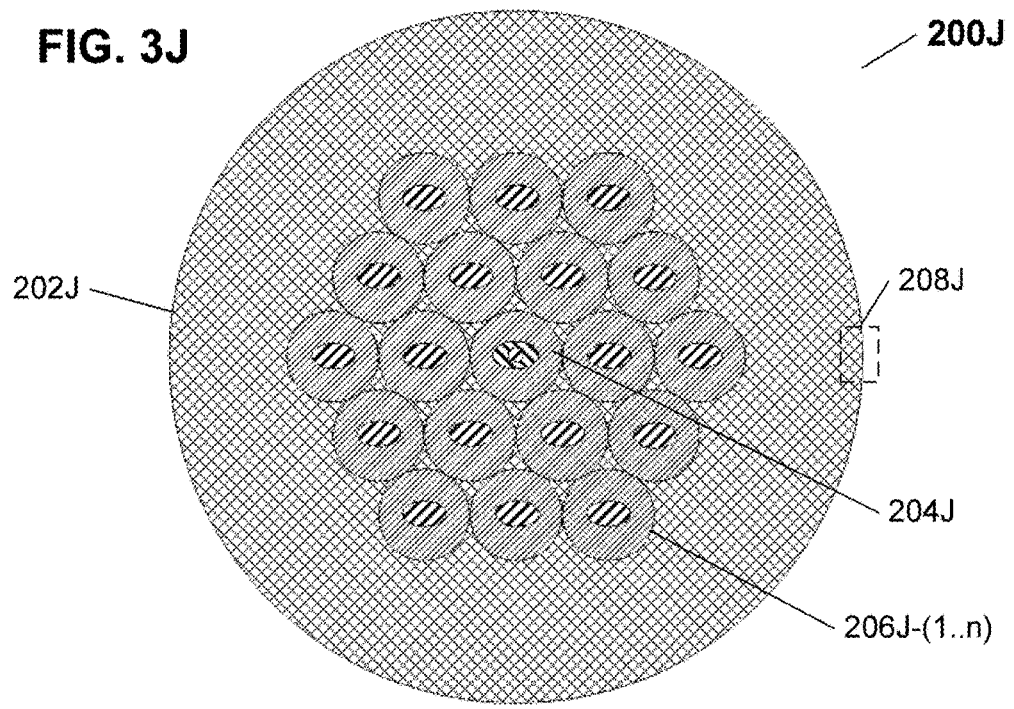
FIG. 3J is a schematic diagram of a cross-sectional view of a first alternative embodiment of the optical fiber coupler array of FIG. 3I, above, in which the polarization maintaining properties of all of the waveguides result only from a non-circular cross-sectional shape of each waveguide's core (or outer core in the case of the VC waveguide), shown by way of example only as being at least in part elliptical, and optionally comprising at least one waveguide arrangement indication element, positioned on an outer region of the single common housing structure, representative of the particular cross-sectional geometric arrangement of the optical coupler array's waveguides, such that a particular cross-sectional geometric waveguide arrangement may be readily identified from at least one of a visual and physical inspection of the single common coupler housing structure, the waveguide arrangement indication element being further operable to facilitate passive alignment of a second end of the optical coupler array to at least one optical device.
Figure 3K:
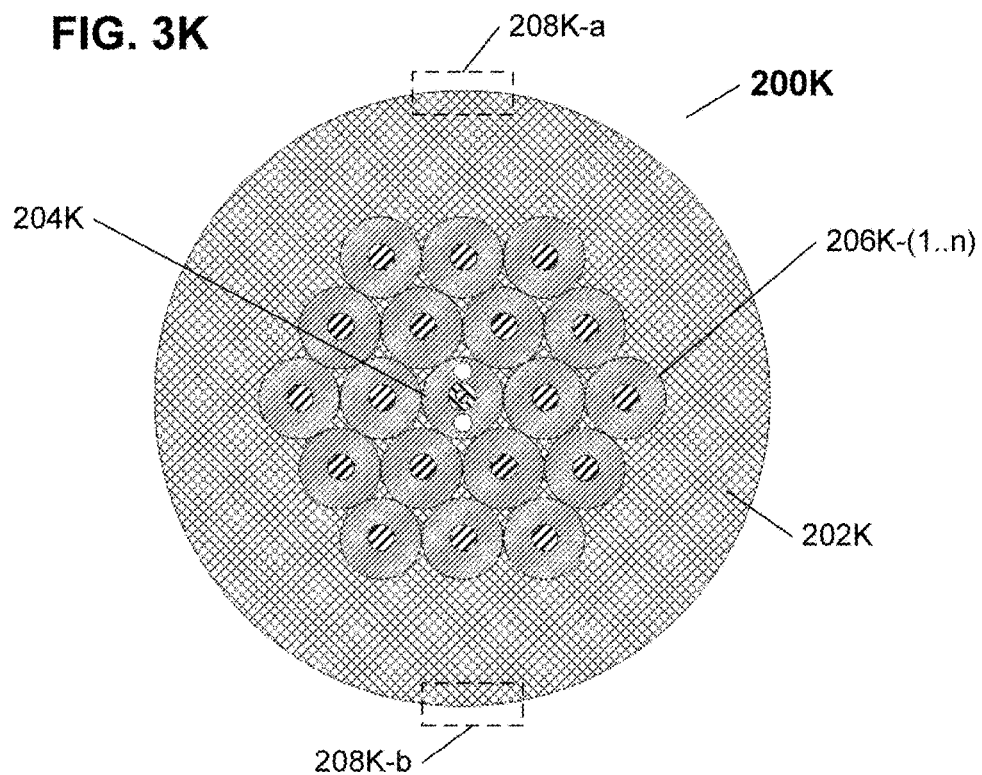
FIG. 3K is a schematic diagram of a cross-sectional view of a fifth alternative embodiment of the optical fiber coupler array of FIG. 3B, above, wherein the centrally positioned single VC waveguide, comprises polarization maintaining properties (shown by way of example only as being induced by rod stress members and which may readily and alternately be induced by various other stress or equivalent designs), and a corresponding polarization axis, and optionally comprising a plurality of optional waveguide arrangement indication elements of the same or of a different type, as described in connection with FIG. 3J.
Figure 3L:
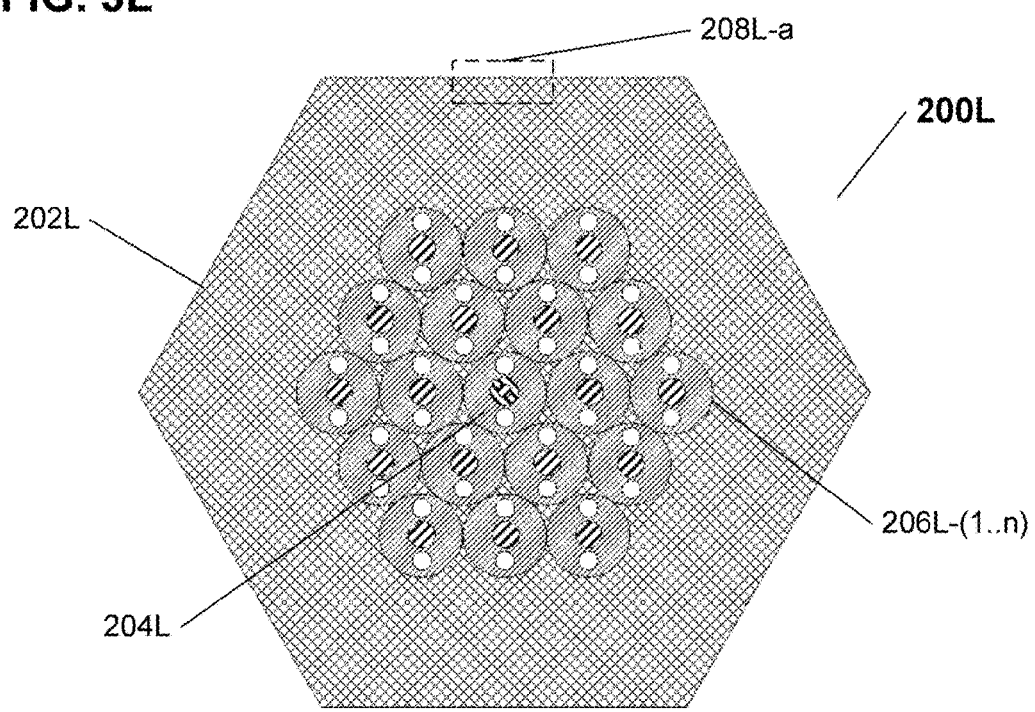
FIG. 3L is a schematic diagram of a cross-sectional view of a second alternative embodiment of the optical fiber coupler array of FIG. 3I, above, in which the single common housing structure comprises a cross section having a non-circular geometric shape (shown by way of example as a hexagon), and in which the polarization axes of the waveguides are aligned to one another and to the single common housing structure cross-section's geometric shape, and optionally further comprises a waveguide arrangement indication element, as described in connection with FIG. 3J.

In accordance with certain embodiments, a polarization axes alignment mode may comprise, but is not limited to, at least one of the following:
  axial alignment of a PM waveguide's polarization axis to the polarization axes of other PM waveguides in the optical coupler; when a PM waveguide is positioned off-center: axial alignment of a PM waveguide's polarization axis to its transverse cross-sectional (geometric) position within the optical coupler;
  when the single common housing structure of the optical coupler comprises a non-circular geometric shape (such as shown by way of example in FIG. 3L): axial alignment of a PM waveguide's polarization axis to a geometric feature of the common housing structure outer shape;
  in optical coupler embodiments comprising one or more waveguide arrangement indicators, described below, in connection with FIGS. 3J-3L: axial alignment of a PM waveguide's polarization axis to at least one geometric characteristic thereof;
  in optical coupler embodiments comprising at least one fiducial element 210A, as described above in connection with FIG. 3A: axial alignment of a PM waveguide's polarization axis to a geometric position of the at least one fiducial element 210A;

The selection of a specific type of polarization axes alignment mode for the various embodiments of the optical coupler is preferably governed by at least one axes alignment criterion, which may include, but which is not limited to: alignment of PM waveguides' polarization axes in a geometric arrangement that increases or maximizes PM properties thereof; and/or satisfying at least one requirement of one or more intended industrial application for the coupler array.

Referring now to FIG. 3H, a first alternative embodiment of the optical fiber coupler array 200G of FIG. 3G, above, is shown as a coupler array 200H, that comprises a single housing structure 202H, and at least one VC waveguide, shown in FIG. 3H by way of example as a PM VC waveguide 204H having polarization maintaining properties, and a plurality of Non-VC waveguides 206H-(1 . . . n), with n being equal to 18 by way of example only. The PM VC waveguide 204H is positioned as a side-channel, off-set from the central longitudinal axis of the single common housing structure 202H, and comprises a polarization axis that is aligned, by way of example, with respect to the transverse off-center location of the PM VC waveguide 204H.

Referring now to FIG. 3I, a fourth alternative embodiment of the optical fiber coupler array 200B of FIG. 3B, above, is shown as a coupler array 200I, that comprises a single housing structure 202I, and at least one VC waveguide, shown in FIG. 3I by way of example as a PM VC waveguide 204I having polarization maintaining properties, and a plurality of PM Non-VC waveguides 206I-(1 . . . n), with n being equal to 18 by way of example only, each also having polarization maintaining properties. The PM VC waveguide 204I is positioned along a central longitudinal axis of the common housing structure 202I, and circumferentially and symmetrically surrounded by proximal parallel plural PM Non-VC waveguides 206I-(1 . . . n). By way of example, the coupler array 200I comprises a polarization axes alignment mode in which the polarization axes of each of the PM VC waveguide 204I and of the plural PM Non-VC waveguides 206I-(1 . . . n) are aligned to one another. The PM properties of the PM VC waveguide 204I and of the plural PM Non-VC waveguides 206I-(1 . . . n) are shown, by way of example only, as being induced by rod stress members (and which may readily and alternately be induced by various other stress, or equivalent designs)).

Referring now to FIG. 3J, a first alternative embodiment of the optical fiber coupler array 200I of FIG. 3I, above, is shown as a coupler array 200J, that comprises a single housing structure 202J, and at least one VC waveguide, shown in FIG. 3J by way of example as a PM VC waveguide 204J having polarization maintaining properties, and a plurality of PM Non-VC waveguides 206J-(1 . . . n), with n being equal to 18 by way of example only, each also having polarization maintaining properties. The PM VC waveguide 204J is positioned along a central longitudinal axis of the common housing structure 202J, and circumferentially and symmetrically surrounded by proximal parallel plural PM Non-VC waveguides 206J-(1 . . . n). The PM properties of the PM VC waveguide 204J and of the plural PM Non-VC waveguides 206J-(1 . . . n) are shown, by way of example only, as resulting only from a non-circular cross-sectional shape (shown by way of example only as being at least in part elliptical), of each plural PM Non-VC waveguide 206J-(1 . . . n) core (and from a non-circular cross-sectional shape of the outer core of the PM VC waveguide 204J).

The coupler array 200J optionally comprises at least one waveguide arrangement indication element 208J, positioned on an outer region of the common housing structure 202J, that is representative of the particular cross-sectional geometric arrangement of the optical coupler array 200J waveguides (i.e., of the PM VC waveguide 204J and of the plural PM Non-VC waveguides 206J-(1 . . . n)), such that a particular cross-sectional geometric waveguide arrangement may be readily identified from at least one of a visual and physical inspection of the common coupler housing structure 202J that is sufficient to examine the waveguide arrangement indication element 208J. Preferably, the waveguide arrangement indication element 208J may be configured to be further operable to facilitate passive alignment of a second end of the optical coupler array 200J to at least one optical device (not shown).

The waveguide arrangement indication element 208J, may comprise, but is not limited to, one or more of the following, applied to the common housing structure 202J outer surface: a color marking, and/or a physical indicia (such as an groove or other modification of the common housing structure 202J outer surface, or an element or other member positioned thereon). Alternatively, the waveguide arrangement indication element 208J may actually comprise a specific modification to, or definition of, the cross-sectional geometric shape of the common housing structure 202J (for example, such as a hexagonal shape of a common housing structure 202L of FIG. 3L, below, or another geometric shape).

By way of example, the coupler array 200J may comprise a polarization axes alignment mode in which the polarization axes of each of the PM VC waveguide 204J and of the plural PM Non-VC waveguides 206J-(1 . . . n) are aligned to one another, or to the waveguide arrangement indication element 208J.

Referring now to FIG. 3K, a fifth alternative embodiment of the optical fiber coupler array 200B of FIG. 3B, above, is shown as a coupler array 200K, that comprises a single housing structure 202K, and at least one VC waveguide, shown in FIG. 3K by way of example as a PM VC waveguide 204K having polarization maintaining properties, and a plurality of Non-VC waveguides 206K-(1 . . . n), with n being equal to 18 by way of example only. The PM VC waveguide 204K is positioned along a central longitudinal axis of the common housing structure 202K, and circumferentially and symmetrically surrounded by proximal parallel plural PM Non-VC waveguides 206K-(1 . . . n). The PM properties of the PM VC waveguide 204K are shown, by way of example only, as being induced by rod stress members (and which may readily and alternately be induced by various other stress, or equivalent approaches)). The coupler array 200K, may optionally comprise a plurality of waveguide arrangement indication elements—shown by way of example only, as waveguide arrangement indication elements 208K-a and 208K-b, which may each be of the same, or of a different type, as described above, in connection with the waveguide arrangement indication element 208J of FIG. 3J.

Referring now to FIG. 3L, a second alternative embodiment of the optical fiber coupler array 200I of FIG. 3I, above, is shown as a coupler array 200L, that comprises a single housing structure 202L comprising a cross section having a non-circular geometric shape (shown by way of example as a hexagon), and at least one VC waveguide, shown in FIG. 3L by way of example as a PM VC waveguide 204L having polarization maintaining properties, and a plurality of PM Non-VC waveguides 206L-(1 . . . n), with n being equal to 18 by way of example only, each also having polarization maintaining properties. The PM VC waveguide 204L is positioned along a central longitudinal axis of the common housing structure 202L, and circumferentially and symmetrically surrounded by proximal parallel plural PM Non-VC waveguides 206L-(1 . . . n).

By way of example, the coupler array 200L comprises a polarization axes alignment mode in which the polarization axes of each of the PM VC waveguide 204L and of the plural PM Non-VC waveguides 206L-(1 . . . n) are aligned to one another, and to the common housing structure 202L cross-sectional geometric shape. The PM properties of the PM VC waveguide 204L and of the plural PM Non-VC waveguides 206L-(1 . . . n) are shown, by way of example only, as being induced by rod stress members (and which may readily and alternately be induced by various other stress, or equivalent designs)). The coupler array 200K, may optionally comprise a waveguide arrangement indication element 208L-a which may comprise any of the configurations described above, in connection with the waveguide arrangement indication element 208J of FIG. 3J.

Figure 4:
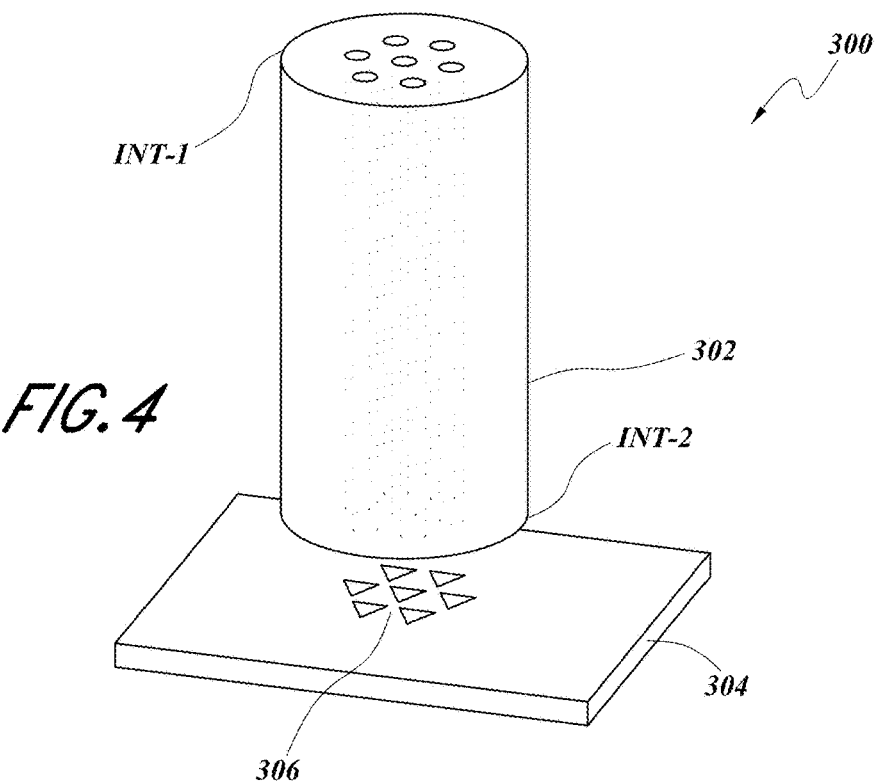
FIG. 4 is a schematic isometric view diagram illustrating an example connection of a second end (i.e. "tip") of the optical fiber coupler array, in the process of connecting to plural vertical coupling elements of an optical device in a proximal open air optical coupling alignment configuration, that may be readily shifted into a butt-coupled configuration through full physical contact of the optical fiber coupler array second end and the vertical coupling elements.

Referring now to FIG. 4, a second end 302 (i.e. "tip") of the optical fiber coupler array is shown, by way of example, as being in the process of connecting to plural vertical coupling elements 306 of an optical device 304 in a proximal open air optical coupling alignment configuration, that may be readily shifted into a butt-coupled configuration through full physical contact of the optical fiber coupler array second end 302 and the vertical coupling elements 306.

Figure 5:
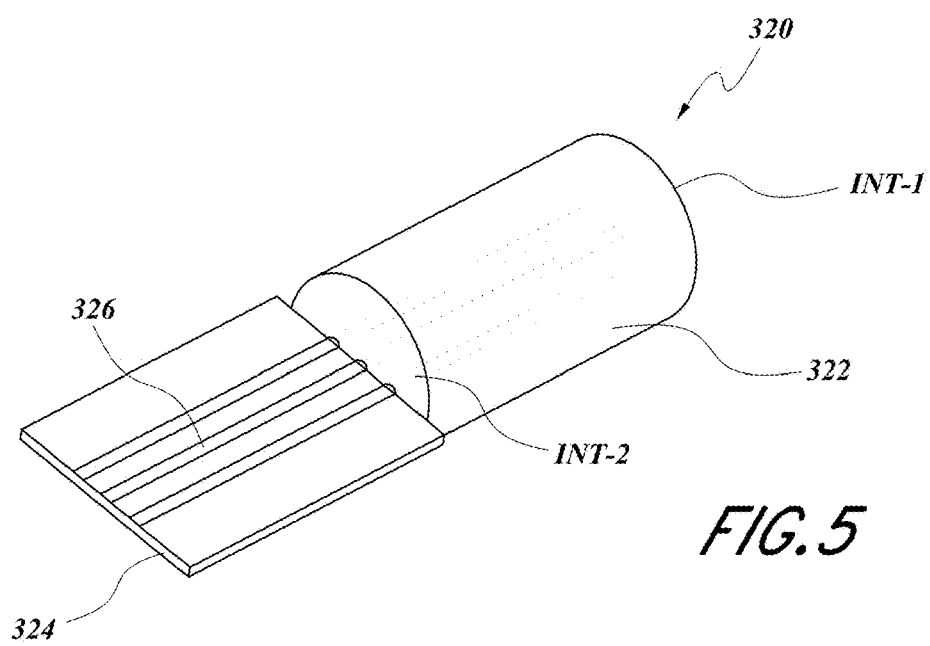
FIG. 5 is a schematic isometric view diagram illustrating an example connection of a second end (i.e. "tip") of the optical fiber coupler array connected to plural edge coupling elements of an optical device in a butt-coupled configuration, that may be readily shifted into one of several alternative coupling configurations, including a proximal open air optical coupling alignment configuration, and or an angled alignment coupling configuration.
Figure 6:
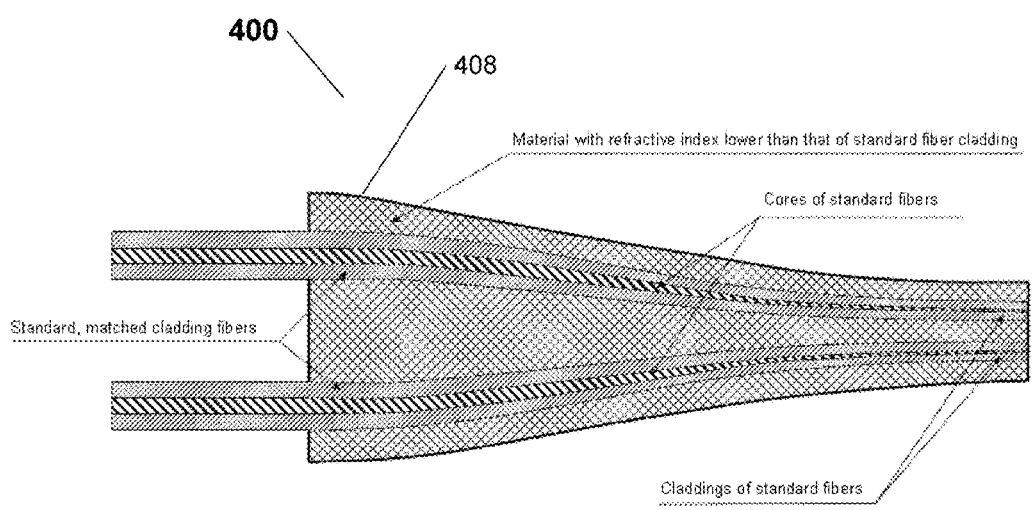
FIG. 6 is a schematic diagram of a cross-sectional view of a previously known optical fiber coupler having various drawbacks and disadvantages readily overcome by the various embodiments of the optical fiber coupler array of FIGS. 1A to 5.

Referring now to FIG. 5 a second end 322 (i.e. "tip") of the optical fiber coupler array is shown, by way of example, as being in the process of connecting to plural edge coupling elements 326 of an optical device 324 in a butt-coupled configuration, that may be readily shifted into one of several alternative coupling configuration, including a proximal open air optical coupling alignment configuration, and or an angled alignment coupling configuration.

In at least one alternative embodiment, the optical coupler array (i.e., such as optical coupler arrays 200D to 200L of FIGS. 3C to 3L) may be readily configured to pump optical fiber lasers, and/or optical fiber amplifiers (or equivalent devices). In a preferred embodiment thereof, a pumping-enabled coupler array comprises a central channel (i.e., waveguide), configured to transmit a signal (i.e., serving as a "signal channel") which will thereafter be amplified or utilized to generate lasing, and further comprises at least one additional channel (i.e., waveguide), configured to provide optical pumping functionality (i.e., each serving as a "pump channel"). In various example alternative embodiments thereof, the pumping-enabled coupler array may comprise the following in any desired combination thereof:

at least one of the following signal channels: a single mode signal channel configured for increased or optimum coupling to a single mode amplifying fiber at at least one predetermined signal or lasing wavelength, a multimode signal channel configured for increased or optimum coupling to a multimode amplifying fiber at at least one predetermined signal or lasing wavelength, and at least one of the following pumping channels: a single mode pumping channel configured for increased or optimum coupling to a single mode pump source at at least one predetermined pumping wavelength, a multimode pumping channel configured for increased or optimum coupling to a multimode pump source at at least one predetermined pumping wavelength.

Optionally, to increase or maximize pumping efficiency, the pumping-enabled coupler array may be configured to selectively utilize less than all the available pumping channels. It should also be noted that, as a matter of design choice, and without departing from the spirit of the invention, the pumping-enabled coupler array may be configured to comprise:

a. At least one signal channel, each disposed in a predetermined desired position in the coupler array structure;
b. At least one pumping channel, each disposed in a predetermined desired position in the coupler array structure; and
c. Optionally—at least one additional waveguide for at least one additional purpose other than signal transmission or pumping (e.g., such as a fiducial marker for alignment, for fault detection, for data transmission, etc.)

Advantageously, the pump channels could be positioned in any transverse position within the coupler, including along the central longitudinal axis. The pump channels may also comprise, but are not limited to, at least one of any of the following optical fiber types: SM, MM, LMA, or VC waveguides. Optionally, any of the optical fiber(s) being utilized as an optical pump channel (regardless of the fiber type) in the coupler may comprise polarization maintaining properties.

In yet another example embodiment, the pumping-enabled coupler array may be configured to be optimized for coupling to a double-clad fiber—in this case, the signal channel of the coupler array would be configured or optimized for coupling to the signal channel of the double-clad fiber, while each of the at least one pumping channels would be configured or optimized to couple to the inner cladding of the double-clad fiber.

In essence, the optical coupler arrays, shown by way of example in various embodiments, may also be readily implemented as high density, multi-channel, optical input/output (I/O) for fiber-to-chip and fiber-to-optical waveguides. The optical fiber couplers may readily comprise at least the following features:

Dramatically reduced channel spacing and device footprint (as compared to previously known solutions)
Scalable channel count
All-glass optical path
Readily butt-coupled or spliced at their high density face without the need of a lens, air gap, or a beam spreading medium
May be fabricated through a semi-automated production process
Broad range of customizable parameters: wavelength, mode field size, channel spacing, array configuration, fiber type.

The optical fiber couplers may be advantageously utilized for at least the following applications, as a matter of design choice or convenience, without departing from the spirit of the invention:

Coupling to waveguides:
  PIC or PCB-based (single-mode or multimode)
  Multicore fibers
  Chip edge (1D) or chip face (2D) coupling
  NA optimized for the application, factoring in:
    Packaging alignment needs
    Chip processing needs/waveguide up-tapering
    Polarization maintaining properties may be readily configured
Coupling to chip-based devices: e.g. VCSELs, photodiodes, vertically coupled gratings
Laser diode coupling
High density equipment Input/Output (I/O)

Figure 7:
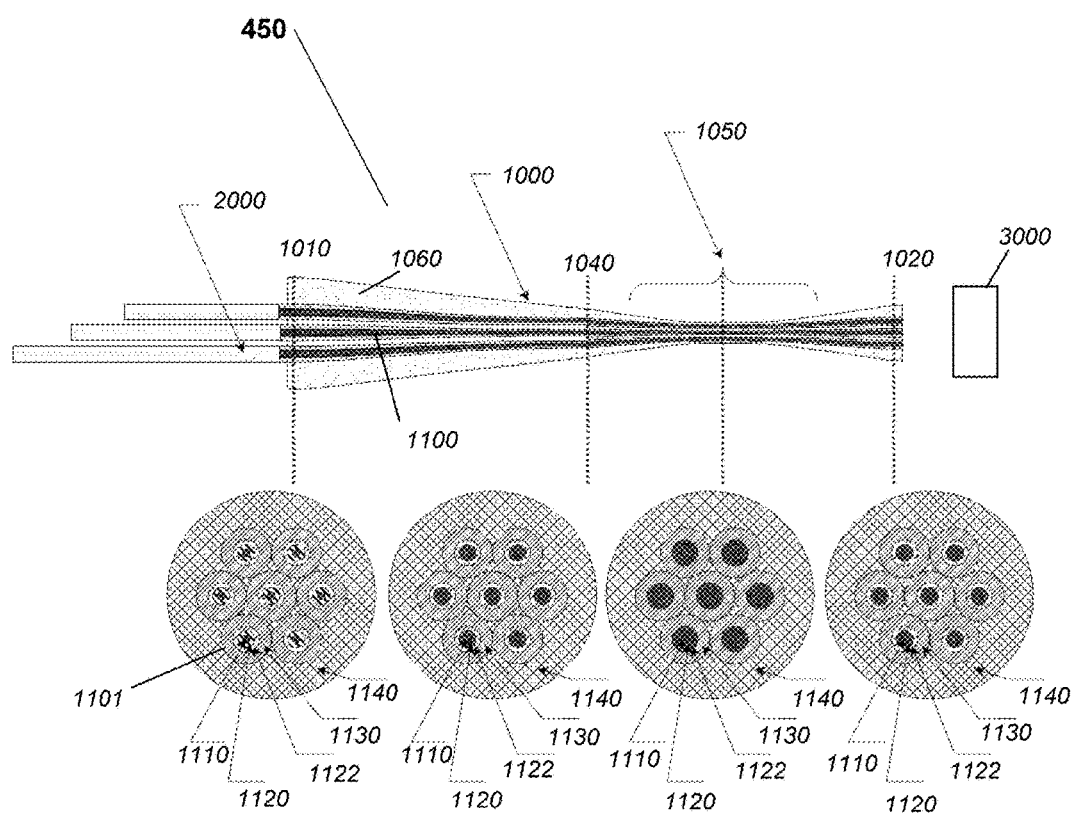
FIG. 7 is a schematic diagram, in various views, of a flexible pitch reducing optical fiber array (PROFA).

Accordingly, when implemented, the various example embodiments of the optical fiber couplers comprise at least the following advantages, as compared to currently available competitive solutions:

Unprecedented density
Low-loss coupling (<0.5 dB)
Operational stability
Form factor support
Broad spectral range
Matching NA
Scalable channel count
Polarization maintenance Referring now to FIG. 7, at least one example embodiment of a flexible optical coupler array is shown as a flexible pitch reducing optical fiber array (PROFA) coupler 450. Although various features of the example PROFA coupler may be described with respect to FIG. 7, any feature described above can be implemented in any combination with a flexible PROFA coupler. For example, any of the features described with respect to FIGS. 1A-5 may be utilized in a flexible PROFA coupler. Further, any feature described with respect to FIGS. 1A-5 may be combined with any feature described with respect to FIG. 7.

With continued reference to FIG. 7, the example flexible PROFA coupler 450 shown in FIG. 7 can be configured for use in applications where interconnections with low crosstalk and sufficient flexibility to accommodate low profile packaging are desired. The vanishing core approach, described herein and in U.S. Patent Application Publication No. 2013/0216184, entitled "CONFIGURABLE PITCH REDUCING OPTICAL FIBER ARRAY", which is hereby incorporated herein in its entirety, allows for the creation of a pitch reducing optical fiber array (PROFA) coupler/interconnect operable to optically couple, for example, a plurality of optical fibers to an optical device (e.g., a PIC), which can be butt-coupled to an array of vertical grating couplers (VGCs). If the cross sectional structure of the coupler 450 has an additional layer of refractive index, N-2A, even lower than N2, as described herein and in U.S. Patent Application Publication No. 2013/0216184, the vanishing core approach can be utilized once more to reduce the outside diameter further without substantially compromising the channel crosstalk. This further reduction can advantageously provide certain embodiments with a flexible region which has a reduced cross section between a first and second end.

In some preferred embodiments, the difference (N-2A minus N-3) is larger than the differences (N-2 minus N-2A) or (N-1 minus N-2), resulting in a high NA, bend insensitive waveguide, when the light is guided by the additional layer having refractive index N-2A. Also, in some preferred embodiments, after the outside diameter of the coupler 450 is reduced along a longitudinal length from one end to form the flexible region, the outer diameter can then be expanded along the longitudinal length toward the second end, resulting in a lower NA waveguide with larger coupling surface area at the second end.

For example, as illustrated in FIG. 7, certain embodiments of an optical coupler array 450 can comprise an elongated optical element 1000 having a first end 1010, a second end 1020, and a flexible portion 1050 therebetween. The optical element 1000 can include a coupler housing structure 1060 and a plurality of longitudinal waveguides 1100 embedded in the housing structure 1060. The waveguides 1100 can be arranged with respect to one another in a cross-sectional geometric waveguide arrangement. In FIG. 7, the example cross-sectional geometric waveguide arrangements of the waveguides 1100 for the first end 1010, the second end 1020, and at a location within the flexible portion 1050 are shown. The cross-sectional geometric waveguide arrangement of the waveguides 1100 for an intermediate location 1040 between the first end 1010 and the flexible portion 1050 is also shown. As illustrated by the shaded regions within the cross sections and as will be described herein, light can be guided through the optical element 1000 from the first end 1010 to the second end 1020 through the flexible portion 1050. As also shown in FIG. 7, this can result in a structure, which maintains all channels discretely with sufficiently low crosstalk, while providing enough flexibility (e.g., with the flexible portion 1050) to accommodate low profile packaging.

The level of crosstalk and/or flexibility can depend on the application of the array. For example, in some embodiments, a low crosstalk can be considered within a range from −45 dB to −35 dB, while in other embodiments, a low crosstalk can be considered within a range from −15 dB to −5 dB. Accordingly, the level of crosstalk is not particularly limited. In some embodiments, the crosstalk can be less than or equal to −55 dB, −50 dB, −45 dB, −40 dB, −35 dB, −30 dB, −25 dB, −20 dB, −15 dB, −10 dB, 0 dB, or any values therebetween (e.g., less than or equal to −37 dB, −27 dB, −17 dB, −5 dB, etc.) In some embodiments, the crosstalk can be within a range from −50 dB to −40 dB, from −40 dB to −30 dB, from −30 dB to −20 dB, from −20 dB to −10 dB, from −10 dB to 0 dB, from −45 dB to −35 dB, from −35 dB to −25 dB, from −25 dB to −15 dB, from −15 dB to −5 dB, from −10 dB to 0 dB, any combinations of these ranges, or any ranges formed from any values from −55 dB to 0 dB (e.g., from −52 dB to −37 dB, from −48 dB to −32 dB, etc.).

The flexibility can also depend on the application of the array. For example, in some embodiments, good flexibility of the flexible portion 1050 can comprise bending of at least 90 degrees, while in other embodiments, a bending of at least 50 degrees may be acceptable. Accordingly, the flexibility is not particularly limited. In some embodiments, the flexibility can be at least 45 degrees, 50 degrees, 55 degrees, 60 degrees, 65 degrees, 70 degrees, 75 degrees, 80 degrees, 90 degrees, 100 degrees, 110 degrees, 120 degrees, or at least any value therebetween. In some embodiments, the flexible portion 1050 can bend in a range formed by any of these values, e.g., from 45 to 55 degrees, from 50 to 60 degrees, from 60 to 70 degrees, from 70 to 80 degrees, from 80 to 90 degrees, from 90 to 100 degrees, from 100 to 110 degrees, from 110 to 120 degrees, or any combinations of these ranges, or any ranges formed by any values within these ranges (e.g., from 50 to 65 degrees, from 50 to 85 degrees, from 65 to 90 degrees, etc.) In other embodiments, the flexible portion 1050 can bend more or less than these values. Bending can typically be associated with light scattering. However, various embodiments can be configured to bend as described herein (e.g., in one of the ranges described above) and achieve relatively low crosstalk as described herein (e.g., in one of the ranges described above).

In various applications, the flexible portion 1050 might not bend in use, however the flexibility can be desired for decoupling the first 1010 or second 1020 end from other parts of the coupler array 450. For example, the flexible portion 1050 of the flexible PROFA coupler 450 can provide mechanical isolation of the first end 1010 (e.g., a PROFA-PIC interface) from the rest of the PROFA, which results in increased stability with respect to environmental fluctuations, including temperature variations and mechanical shock and vibration.

In the example shown in FIG. 7, the coupler array 450 can be operable to optically couple with a plurality of optical fibers 2000 and/or with an optical device 3000. The optical fibers 2000 and optical device 3000 can include any of those described herein. The coupler array 450 can couple with the optical fibers 2000 via the plurality of waveguides 1100 at the first end 1010. In addition, the coupler array 450 can couple with the optical device 3000 via the plurality of waveguides 1100 at the second end 1020. As described herein, the plurality of waveguides 1100 can include at least one VC waveguide 1101. FIG. 7 illustrates all of the waveguides 1100 as VC waveguides. However, one or more Non-VC waveguides may also be used. In addition, FIG. 7 illustrates 7 VC waveguides, yet any number of VC and/or Non-VC waveguides can be used.

As also shown in the cross sections, each of the waveguides 1100 can be disposed at an individual corresponding cross-sectional geometric position, relative to other waveguides of the plurality of waveguides 1100. Although FIG. 7 shows a waveguide surrounded by 6 other waveguides, the cross-sectional geometric waveguide arrangement is not limited and can include any arrangement known in the art or yet to be developed including any of those shown in FIGS. 3A-3L.

As described herein, the VC waveguide 1101 can include an inner core (e.g., an inner vanishing core) 1110, an outer core 1120, and an outer cladding 1130 with refractive indices N-1, N-2, and N-3 respectively. As shown in FIG. 7, the VC waveguide 1101 can also include a secondary outer core 1122 (e.g., between the outer core 1120 and the outer cladding 1130) having refractive index N-2A. As the outer core 1120 can longitudinally surround the inner core 1110, the secondary outer core 1122 can longitudinally surround the outer core 1120 with the outer cladding 1130 longitudinally surrounding the secondary outer core 1122. In various embodiments, the relationship between the refractive indices of the inner core 1110, outer core 1120, secondary outer core 1122, and outer cladding 1130 can advantageously be N-1>N-2>N2-A>N-3. With such a relationship, each surrounding layer can serve as an effective cladding to the layers within it (e.g., the outer core 1120 can serve as an effective cladding to the inner core 1110, and the secondary outer core 1122 can serve as an effective cladding to the outer core 1120). Hence, the use of the secondary outer core 1122 can provide an additional set of core and cladding.

By including the secondary outer core 1122 with a refractive index N-2A, certain embodiments can achieve a higher NA (e.g., compared to without the secondary outer core 1122). In various embodiments, the difference (N-2A minus N-3) can be larger than the differences (N-2 minus N-2A) or (N-1 minus N-2) to result in a relatively high NA. Increasing NA can reduce the MFD, allowing for the channels (e.g., waveguides 1100) to be closer to each other (e.g., closer spacing between the waveguides 1100) without compromising crosstalk. Accordingly, the coupler array 450 can be reduced further in cross section (e.g., compared to without the secondary outer core 1122) to provide a reduced region when light is guided by the secondary outer core 1122. By providing a reduced region between the first end 1010 and the second end 1020, certain embodiments can include a flexible portion 1050 which can be more flexible than the regions proximal to the first end 1010 and the second end 1020.

For example, the inner core 1110 size, the outer core 1120 size, and the spacing between the waveguides 1100 can reduce (e.g., simultaneously and gradually in some instances) along the optical element 1000 from the first end 1010 to the intermediate location 1040 such that at the intermediate location 1040, the inner core 1110 size is insufficient to guide light therethrough and the outer core 1120 size is sufficient to guide at least one optical mode. In certain embodiments, each waveguide 1100 can have a capacity for at least one optical mode (e.g., single mode or multi-mode). For example, at the first end 1010, the VC waveguide 1101 can support a number of spatial modes (M1) within the inner core 1110. At the intermediate location 1040, in various embodiments, the inner core 1110 may no longer be able to support all the M1 modes (e.g., cannot support light propagation). However, in some such embodiments, at the intermediate location 1040, the outer core 1120 can be able to support all the M1 modes (and in some cases, able to support additional modes). In this example, light traveling within the inner core 1110 from the first end 1010 to the intermediate location 1040 can escape from the inner core 1110 into the outer core 1120 such that light can propagate within both the inner core 1110 and outer core 1120.

In addition, the outer core 1120 size, the secondary outer core 1122 size, and the spacing between the waveguides 1100 can reduce (e.g., simultaneously and gradually in some instances) along said optical element 1000, for example, from the intermediate location 1040 to the flexible portion 1050 such that at the flexible portion 1050, the outer core 1120 size is insufficient to guide light therethrough and the secondary outer core 1122 size is sufficient to guide at least one optical mode therethrough. In certain embodiments, at the intermediate location 1040, the VC waveguide 1101 can support all the M1 modes within the outer core 1120. At the flexible portion 1050, in various embodiments, the outer core 1120 may be no longer able to support all the M1 modes (e.g., cannot support light propagation). However, in some such embodiments, at the flexible portion 1050, the secondary outer core 1122 can be able to support all the M1 modes (and in some cases, able to support additional modes). In this example, light traveling within the outer core 1120 from the intermediate location 1040 to the flexible portion 1050 can escape from the outer core 1120 into the secondary outer core 1122 such that light can propagate within the inner core 1110, the outer core 1120, and secondary outer core 1122.

Furthermore, the outer core 1120 size, the secondary outer core 1122 size, and the spacing between the waveguides 1100 can expand (e.g., simultaneously and gradually in some instances) along the optical element 1000 from the flexible portion 1050 to the second end 1020 such that at the second end 1020, the secondary outer core 1122 size is insufficient to guide light therethrough and the outer core 1120 size is sufficient to guide at least one optical mode therethrough. In certain embodiments, at the second end 1020, in various embodiments, the secondary outer core 1122 may no longer be able to support all the M1 modes (e.g., cannot support light propagation). However, in some such embodiments, at the second end 1020, the outer core 1120 can be able to support all the M1 modes (and in some cases, able to support additional modes). In this example, light traveling within the secondary outer core 1122 from the flexible portion 1050 to the second end 1020 can return and propagate only within the inner core 1110 and the outer core 1120.

It would be appreciated that light travelling from the second end 1020 to the first end 1010 can behave in the reverse manner. For example, the outer core 1120 size, the secondary outer core 1122 size, and spacing between the waveguides 1100 can reduce (e.g., simultaneously and gradually in some instances) along the optical element 1000 from the second end 1020 to the flexible portion 1050 such that at the flexible portion 1050, the outer core 1120 size is insufficient to guide light therethrough and the secondary outer core 1122 size is sufficient to guide at least one optical mode therethrough.

The reduction in cross-sectional core and cladding sizes can advantageously provide rigidity and flexibility in a coupler array 450. Since optical fibers 2000 and/or an optical device 3000 can be fused to the ends 1010, 1020 of the coupler array 450, rigidity at the first 1010 and second 1020 ends can be desirable. However, it can also be desirable for coupler arrays to be flexible so that they can bend to connect with low profile integrated circuits. In certain embodiments, the flexible portion 1050 between the first 1010 and second 1020 ends can allow the first 1010 and second 1020 ends to be relatively rigid, while providing the flexible portion 1050 therebetween. The flexible portion can extend over a length of the optical element 1000 and can mechanically isolate the first 1010 and second 1020 ends. For example, the flexible portion 1050 can mechanically isolate the first end 1010 from a region between the flexible portion 1050 and the second end 1020. As another example, the flexible portion 1050 can mechanically isolate the second end 1020 from a region between the first end 1010 and the flexible portion 1050. Such mechanical isolation can provide stability to the first 1010 and second 1020 ends, e.g., with respect to environmental fluctuations, including temperature variations and mechanical shock and vibration. The length of the flexible portion 1050 is not particularly limited and can depend on the application. In some examples, the length can be in a range from 2 to 7 mm, from 3 to 8 mm, from 5 to 10 mm, from 7 to 12 mm, from 8 to 15 mm, any combination of these ranges, or any range formed from any values from 2 to 20 mm (e.g., 3 to 13 mm, 4 to 14 mm, 5 to 17 mm, etc.). In other examples, the length of the flexible portion 1050 can be shorter or longer.

At the same time, the flexible portion 1050 can provide flexibility. In many instances, the flexible portion 1050 can have a substantially similar cross-sectional size (e.g., the cross-sectional size of the waveguides 1100) extending over the length of the flexible portion 1050. In certain embodiments, the cross-section size at the flexible portion 1050 can comprise a smaller cross-sectional size than the cross-sectional size at the first 1010 and second 1020 ends. Having a smaller cross-sectional size, this flexible portion 1050 can be more flexible than a region proximal to the first 1010 and second 1020 ends. The smaller cross-sectional size can result from the reduction in core and cladding sizes. An optional etching post-process may be desirable to further reduce the diameter of the flexible length of the flexible PROFA coupler 450.

In some embodiments, the flexible portion 1050 can be more flexible than a standard SMF 28 fiber. In some embodiments, the flexible portion 1050 can bend at least 45 degrees, 50 degrees, 55 degrees, 60 degrees, 65 degrees, 70 degrees, 75 degrees, 80 degrees, 90 degrees, 100 degrees, 110 degrees, 120 degrees, or at least any value therebetween. In some embodiments, the flexible portion 1050 can bend in a range formed by any of these values, e.g., from 45 to 55 degrees, from 50 to 60 degrees, from 60 to 70 degrees, from 70 to 80 degrees, from 80 to 90 degrees, from 90 to 100 degrees, from 100 to 110 degrees, from 110 to 120 degrees, or any combinations of these ranges, or any ranges formed by any values within these ranges (e.g., from 50 to 65 degrees, from 50 to 85 degrees, from 65 to 90 degrees, etc.) In other embodiments, the flexible portion 1050 can bend more or less than these values. As described herein, in various applications, the flexible portion 1050 might not bend in use, however the flexibility can be desired for decoupling the first 1010 or second 1020 end from other parts of the coupler array 450.

The coupler array 450 can include a coupler housing structure 1060. For example, the coupler housing structure 1060 can include a common single coupler housing structure. In certain embodiments, the coupler housing structure 1060 can include a medium 1140 (e.g., having a refractive index N-4) surrounding the waveguides 1100. In some instances, N-4 is greater than N-3. In other examples, N-4 is equal to N-3. The medium 1140 can include any medium as described herein (e.g., pure-silica). The medium can also include glass such that the coupler array 450 can be an all-glass coupler array. The waveguides 1100 can be embedded within the medium 1040 of the housing structure 1060. In some examples, a total volume of the medium 1140 of the coupler housing structure 1060 can be greater than a total volume of all the inner and outer cores 1110, 1120, 1122 of the VC waveguides confined within the coupler housing structure 1060.

In some embodiments, each waveguide can couple to the optical fibers 2000 and/or optical device 3000 at a location inside, outside, or at a boundary region of the coupler housing structure 1060, e.g., as shown in FIGS. 1A to 2D. Because the optical fibers 2000 and optical device 3000 can be different at each end, the first end 1010 and the second end 1020 can each be configured for the optical fibers 2000 or optical device 3000 with which it is coupled. For example, the MFD of the VC waveguide at the first 1010 and/or second 1020 ends can be configured (e.g., using the sizes of the cores) to match or substantially match the MFD of the optical fiber 2000 or optical device 3000 with which it is coupled. In addition, the NA of the VC waveguide at the first 1010 and/or second 1020 ends can be configured (e.g., using the refractive indices) to match or substantially match the NA of the optical fiber 2000 or optical device 3000 with which it is coupled. The refractive indices can be modified in any way known in the art (e.g., doping the waveguide glass) or yet to be developed. In various embodiments, as described herein, the difference (N-1 minus N-2) can be greater than the difference (N-2 minus N-2A) such that the NA at the first end 1010 is greater than the NA at the second end 1020. In other embodiments, the difference (N-1 minus N-2) can be less than the difference (N-2 minus N-2A) such that the NA at the first end 1010 is less than the NA at the second end 1020. In yet other embodiments, the difference (N-1 minus N-2) can be equal to (N-2 minus N-2A) such that the NA at the first end 1010 is equal to the NA at the second end 1020. The VC waveguide can include any of the fiber types described herein including but not limited to a single mode fiber, a multi-mode fiber, and/or a polarization maintaining fiber.

The core and cladding (1110, 1120, 1122, 1130) sizes (e.g., outer cross-sectional diameters if circular or outer cross-sectional dimensions if not circular) are not particularly limited. In some embodiments, the inner 1110 and/or outer 1120 core sizes can be in a range from 1 to 3 microns, from 2 to 5 microns, from 4 to 8 microns, from 5 to 10 microns, any combination of these ranges, or any range formed from any values from 1 to 10 microns (e.g., 2 to 8 microns, 3 to 9 microns, etc.). However, the sizes can be greater or less. For example, the inner 1110 and/or outer 1120 core sizes can range from submicrons to many microns, to tens of microns, to hundreds of microns depending, for example, on the wavelength and/or number of modes desired.

In addition, the difference in the refractive indices (e.g., between N-1 and N-2, between N-2 and N-2A, and/or between N-2A and N-3) is not particularly limited. In some examples, the index difference can be in a range from $1.5 \times 10^{-3}$ to $2.5 \times 10^{-3}$, from $1.7 \times 10^{-3}$ to $2.3 \times 10^{-3}$, from $1.8 \times 10^{-3}$ to $2.2 \times 10^{-3}$, from $1.9 \times 10^{-3}$ to $2.1 \times 10^{-3}$, from $1.5 \times 10^{-3}$ to $1.7 \times 10^{-3}$, from $1.7 \times 10^{-3}$ to $1.9 \times 10^{-3}$, from $1.9 \times 10^{-3}$ to $2.1 \times 10^{-3}$, from $2.1 \times 10^{-3}$ to $2.3 \times 10^{-3}$, from $2.3 \times 10^{-3}$ to $2.5 \times 10^{-3}$, any combination of these ranges, or any range formed from any values from $1.5 \times 10^{-3}$ to $2.5 \times 10^{-3}$. In other examples, the index difference can be greater or less.

As described herein, the optical device 3000 can include a PIC. The PIC can include an array of VGCs. Also, as described in U.S. Patent Application Publication 2012/0257857, entitled "HIGH DENSITY OPTICAL PACKAGING HEADER APPARATUS", which is hereby incorporated herein in its entirety, multiple flexible PROFA couplers (such as the coupler 450), each having multiple optical channels, can be combined together to advantageously form an optical multi-port input/output (IO) interface. As such, an optical multi-port 10 interface can include a plurality of optical coupler arrays, at least one of the optical coupler arrays can include an optical coupler array 450 as described herein.

Figure 9:
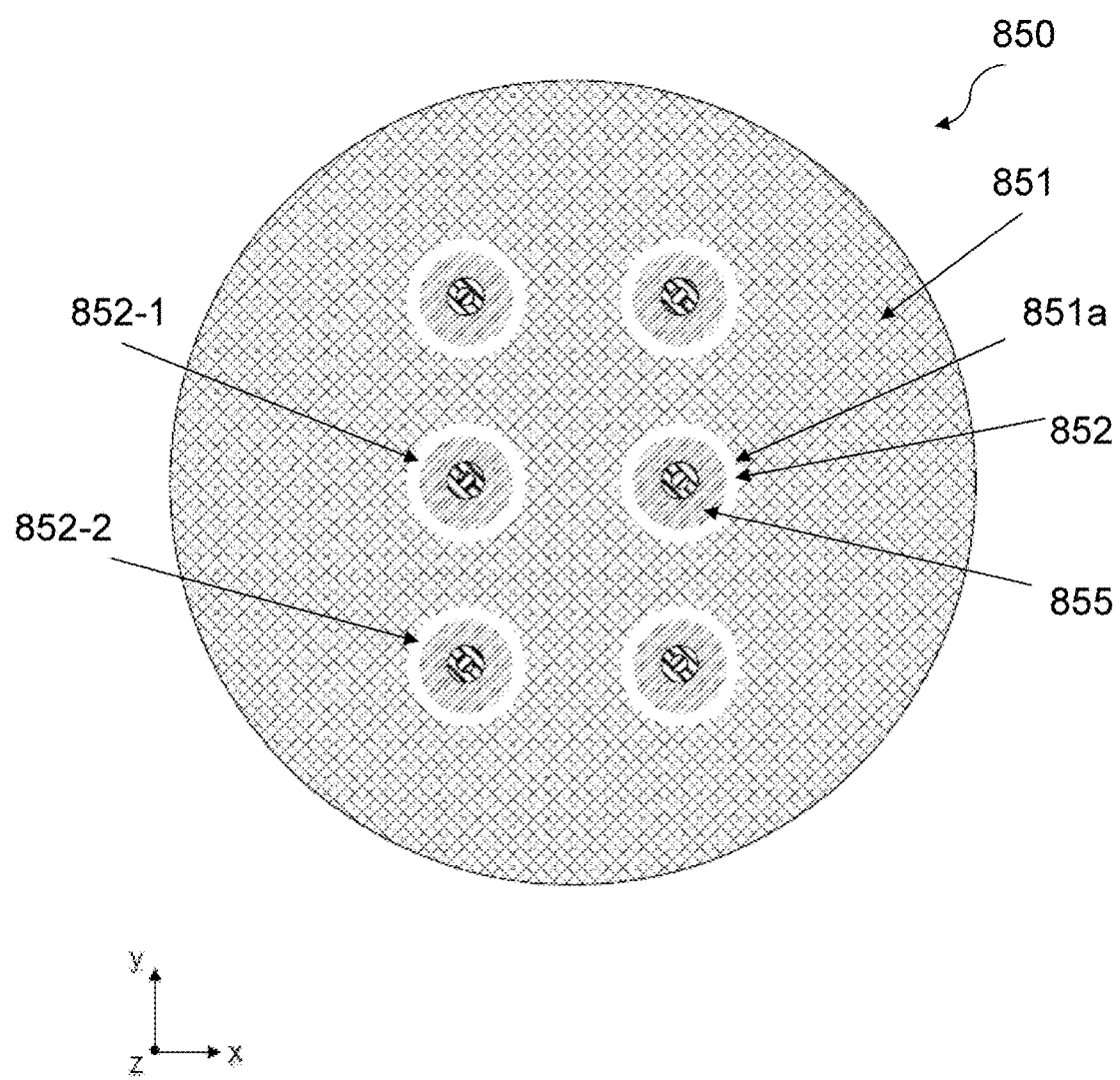
FIG. 9 is a schematic diagram of a cross-sectional view of another example configuration of the housing structure at a proximity to a first end of the optical coupler array.

With reference now to FIG. 8 and FIG. 9, example cross sectional views of the housing structure at a proximity to a first end of a multichannel optical coupler array are shown. The cross-sectional view is orthogonal to the longitudinal direction or length of the optical coupler array. Some such configurations may have improved cross sectional or transverse (or lateral) positioning of waveguides at the first end allowing for self-aligning waveguide arrangement at a close proximity to a first end (e.g., hexagonal close packed arrangement in a housing structure having circular (as shown in FIG. 8) or hexagonal inner cross section) and improved (precise or near precise in some cases) cross sectional positioning of the waveguides at a second end. Such configurations may also provide alignment during manufacturing such that the cross sectional positioning of the waveguides at a second end may be more precisely disposed as desired.

Although various features of the example optical coupler arrays may be described with respect to FIGS. 8 and 9, any feature described above (for example, in connection with any of the figures or embodiments describe above) can be implemented in any combination with a multichannel optical coupler array. For example, any of the features described with respect to FIGS. 1A-5 and 7 may be utilized in a multichannel optical coupler array and may be combined with any feature described with respect to FIGS. 8 and 9.

For example, referring to the example embodiments shown in FIGS. 1A-2D, there are two ends of the coupler array: a first (larger) end, and a second (smaller) end. The two ends are spaced apart in the longitudinal direction (along the z direction). For example, in FIG. 1A, the first end is proximate to position B and the second end is proximate to positions C and D.

In certain embodiments, one of the functions of the first end (proximate to position B) is to encapsulate the waveguides 30A, 32A-1, 32A-2 with increased or approximate positioning accuracy. For example, the coupler housing structure 14A at a proximity to the first end (proximate to position B) may encapsulate, e.g., circumferentially surround a portion of the length of the waveguides 30A, 32A-1, 32A-2, but not necessarily completely enclose the ends of the waveguides 30A, 32A-1, 32A-2. In some such instances, the waveguides 30A, 32A-1, 32A-2 may or may not extend (e.g., longitudinally) outside the coupler housing structure 14A. In FIG. 1A, proximate the first end, the end of waveguide 30A is disposed within the coupler housing structure 14A, but the ends of waveguides 32A-1 and 32A-2 extend, e.g., longitudinally (in a direction parallel to the z-direction) outside of the coupler housing structure 14A. In FIG. 2B, proximate the first end, the ends of waveguides 130B-1, 130B-2 are disposed at an outer cross sectional boundary region of the coupler housing structure 14A and do not extend, e.g., longitudinally (in a direction parallel to the z-direction) outside of the coupler housing structure 14A.

In various embodiments, one of the functions of the second end (proximate to positions C and D) is to have the waveguides 30A, 32A-1, 32A-2 embedded in a housing structure (e.g., a common housing structure in some instances) with improved (precise or near precise in some cases) cross sectional positioning. For example, the waveguides 30A, 32A-1, 32A-2 at a proximity to the second end (proximate to positions C and D) may be embedded, e.g., be circumferentially surrounded by the contiguous coupler housing structure 14A. In FIG. 1A, proximate the second end, the ends of waveguides 30A, 32A-1, 32A-2 are longitudinally disposed at an outer cross sectional boundary region of the coupler housing structure 14A. In some embodiments, proximate the second end, one or more ends of the waveguides may be disposed within or may longitudinally extend outside the coupler housing structure 14A.

To achieve improved positioning, some embodiments can include the example cross sectional configuration of the housing structure shown in FIG. 8 at a proximity to the first end. The cross section is orthogonal to the longitudinal direction or length of the optical coupler array. As shown in FIG. 8, the coupler array 800 can include a housing structure 801 having a transverse (or lateral) configuration of a ring surrounding the plurality of longitudinal waveguides 805 at a close longitudinal proximity to the first end. A gap, such as an air gap, may separate the plurality of longitudinal waveguides 805 from the surrounding ring. Some such configurations may allow for self-aligning waveguide arrangement at a close proximity to a first end (e.g., hexagonal close packed arrangement in a housing structure having circular (as shown in FIG. 8) or hexagonal inner cross section)

In an example configuration shown in FIG. 8, the waveguides 805 are in a hexagonal arrangement. Other arrangements are possible, e.g., square, rectangular, etc.

The ring may have an inner cross section 801a (in the transverse direction, i.e., orthogonal to the longitudinal direction or length of the optical coupler array) that is circular or non-circular. For example, the inner cross section 801a may be circular, elliptical, D-shaped, square, rectangular, hexagonal, pentagonal, octagonal, other polygonal shape, etc. The inner cross section 801a does not necessarily follow the arrangement of the waveguides 805. For example, four waveguides arranged in a square arrangement can be confined in an inner circular cross section. As another example, as shown in FIG. 8, the inner cross section 801a is circular, while the waveguides 805 are hexagonally arranged. In some embodiments, a circular inner cross section, as shown in FIG. 8, may be a preferred shape, which can allow for a close-pack hexagonal arrangement. Also, other inner cross sectional shapes may also be used, such as square or rectangular, which can allow for non-hexagonal waveguide arrangements. In some instances, the inner cross section 801a may be similar as the arrangement of the waveguides 805 to reduce empty space. For example, for waveguides 805 in a hexagonal arrangement, the inner cross section 801a of the ring may be hexagonal to reduce empty space between the inner cross section 801a and the waveguides 805.

The outer cross section 801b (in the transverse direction, e.g., orthogonal to the longitudinal direction or length of the optical coupler array) may be circular or non-circular. For example, the outer cross section 801b may be circular, elliptical, hexagonal, D-shaped (e.g., to provide for passive axial alignment of the coupler since the flat surface allow for an easy rotational alignment), square, rectangular, pentagonal, octagonal, other polygonal shape, etc. In FIG. 8, the outer cross section 801b (e.g., circular) follows the shape of the inner cross section 801a (e.g., circular). However, in some embodiments, the outer cross section 801b need not be similar as the inner cross section 801a. One of the functions of the inner cross sectional shape is to allow for an improvement in the transverse positional accuracy at the proximity to the second end, while one of the functions of the outer cross sectional shape is to allow for a passive axial alignment of the coupler (e.g., the alignment can be done without launching light into the coupler). In some configurations it may be preferred to substantially preserve the outer cross sectional shape from the first end to the second end to facilitate the passive alignment at one of the ends or at both ends of the coupler array.

FIG. 9 shows another example cross sectional configuration of the housing structure at a proximity to the first end. As shown in FIG. 9, the coupler array 850 can include a housing structure 851 having a configuration of a structure (e.g., a contiguous structure in some cases) with a plurality of holes 852. At least one of the holes 852 may contain at least one of the longitudinal waveguides 855. A gap, such as an air gap, may separate the plurality of longitudinal waveguides 855 from the surrounding housing structure 851. Similarly to the description related to the example shown in FIG. 8, the outer cross section may be circular, elliptical, hexagonal, D-shaped, square, rectangular, pentagonal, octagonal, other polygonal shape, etc. Some of such configurations may allow for passive alignment at one of the ends or at both ends of the coupler array. While the example configuration shown in FIG. 8 may allow for simpler fabrication in some cases, the example configuration shown in FIG. 9 may allow for arbitrary transverse waveguide positioning.

FIG. 9 shows an example configuration with six holes 852, yet other number of holes is possible. The holes 852 in this example configuration may be isolated or some or even all holes 852 may be connected. For example, as shown in FIG. 9, a first hole 852-1 is isolated from a second hole 852-2. However, in some configurations, the first hole 852-1 may be connected to at least one second hole 852-2. The arrangement of the holes 852 is shown as a 3×2 array, yet other arrangements are possible. For example, the hole arrangement pattern may be hexagonal, square, rectangular, or defined by an XY array defining positions of the holes in the transverse plane.

FIG. 9 shows all the holes 852 with a waveguide 855 illustrated as a vanishing core (VC) waveguide. However, while at least one of the waveguide in this example is a VC waveguide, one or more of the holes 852 may include a non-vanishing core (Non-VC) waveguide. The VC or Non-VC waveguide 855 can include any of the waveguides described herein, e.g., single mode fiber, multi-mode fiber, polarization maintaining fiber, etc. In some embodiments, one or more of the holes 852 may be empty, or populated with the other (e.g., non-waveguide) material, e.g., to serve as fiducial marks. One or more of the holes 852 may be populated with a single waveguide 855 (in some preferred configurations) as shown in FIG. 9 or with multiple waveguides 855. Depending on the design, one or more of the holes 852 may be identical or different than another hole 852 to accommodate, for example, waveguides 855 of different shapes and dimensions (e.g., cross sectional shapes, diameters, major/minor elliptical dimensions, etc.). The cross sections of the holes 852 may be circular or non-circular. For example, the cross section may be circular, elliptical, hexagonal or D-shaped (e.g., to provide for passive axial alignment of polarization maintaining (PM) channels), square, rectangular, pentagonal, octagonal, other polygonal shape, etc. As illustrated, in many cases, the cross section of the hole 852 at close proximity to the first end is larger than the cross section of the waveguides 855 such that a gap is disposed between an inner surface 851a of the coupler housing structure 851 and the waveguide 855.

The coupler housing structure (e.g., 801 in FIG. 8 or 851 in FIG. 9) can include a medium from a wide range of materials as described herein. As also described herein, the medium of the coupler housing structure 801, 851 can have refractive index (N-4). The medium can be a transversely contiguous medium. This can allow for a robust housing structure with improved transverse positioning accuracy in some embodiments. In some embodiments, the total volume of the medium of the coupler housing structure 801, 851 can be greater than a total volume of all the inner and outer cores of the VC waveguides confined within the coupler housing structure 801, 851 to provide that in some embodiments, all VC waveguides are reliably embedded in the housing structure allowing for stable performance).

In certain embodiments, the example configurations shown in FIG. 8 and FIG. 9 may allow for improved manufacturability of the devices with improved cross sectional (transverse) positioning of the waveguides e.g., at the second end. This transverse position, may for example, be defined in the x and/or y directions, while z is the direction along the length coupler array (e.g., from the first end to the second end). In various fabrication approaches, the assembly, comprising the waveguides (e.g., 805 in FIGS. 8 and 855 in FIG. 9) and coupler housing structure (e.g., 801 in FIG. 8 or 851 in FIG. 9), may be heated and drawn to form a second end as shown in the lateral cross sectional views shown in FIGS. 3A-3L. Referring to FIG. 8, the waveguides 805 can be inserted into the coupler housing structure 801 having a configuration of a ring (in the cross section orthogonal to the longitudinal direction or length of the optical coupler array, e.g., in the x-y plane shown). As described above, a gap such as an air gap can be disposed between the coupler housing structure 801 and the waveguide 805 to permit lateral movement (in x and/or y directions) of the waveguide with respect to the coupler housing structure 801. Referring to FIG. 9, one or more waveguides 855 can be inserted into the coupler housing structure 851 having a plurality of holes 852 (e.g., as seen in the cross section orthogonal to the longitudinal direction or length of the optical coupler array, e.g., in the x-y plane shown) where the waveguides 855 can be passively aligned within the housing structure 851. A gap such as an air gap can be disposed between the coupler housing structure 851 and the waveguide 855 to permit transverse movement (in x and/or y directions) of the waveguide with respect to the coupler housing structure 851. In the case of close packed waveguide arrangement (e.g., hexagonal), this ability to move can result in more precise cross sectional positioning at the second end after manufacturing.

Referring to FIG. 1A, the coupler array can include a plurality of longitudinal waveguides 30A, 32A-1, 32A-2 with at least one VC waveguide 30A having an inner core 20A and an outer core 22A. The inner core 20A, the outer core 22A, and the spacing between the plurality of waveguides 30A, 32A-1, 32A-2 can reduce (e.g., simultaneously and gradually in some cases) from the first end (proximate to position B) to the second end (proximate to positions C and D), e.g., from S-1 to S-2. In various embodiments, the cross sectional configuration at the first end (proximate position B) is shown as in FIG. 8 or FIG. 9, while the cross sectional configuration at the second end (proximate positions C and D) can be shown in FIGS. 3A-3L or FIG. 7. In some embodiments, proximate to the second end, there is substantially no gap between the coupler housing structure and the waveguides, some gaps being filled by housing material and some gaps being filled by waveguide cladding material. As a result of the described cross sectional configuration at the first end, the cross sectional or transverse positioning of the waveguides at the second end can be improved. The waveguides at the second end can thus be properly aligned in the transverse direction (e.g., x and/or y direction) with an optical device.

Figure 10:
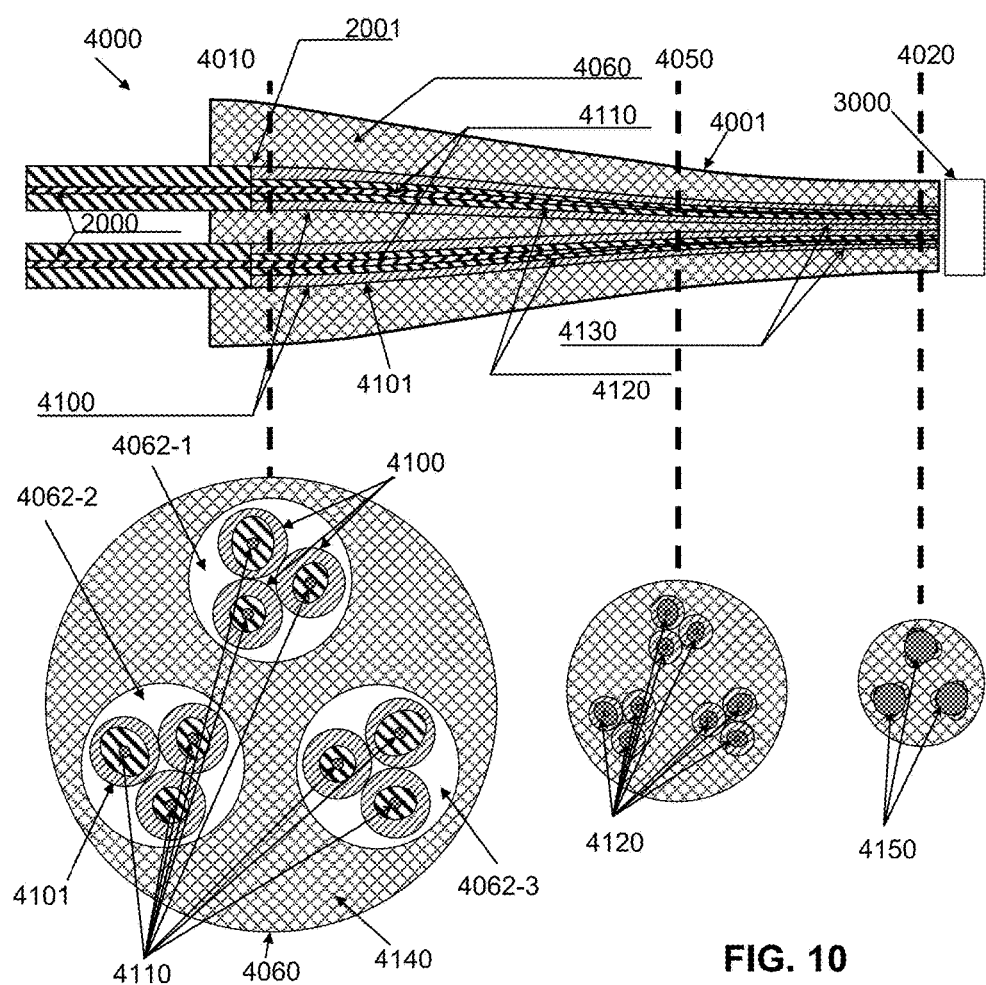
FIG. 10 and FIG. 11 are schematic diagrams, in various views, of additional example optical coupler arrays.
Figure 11:
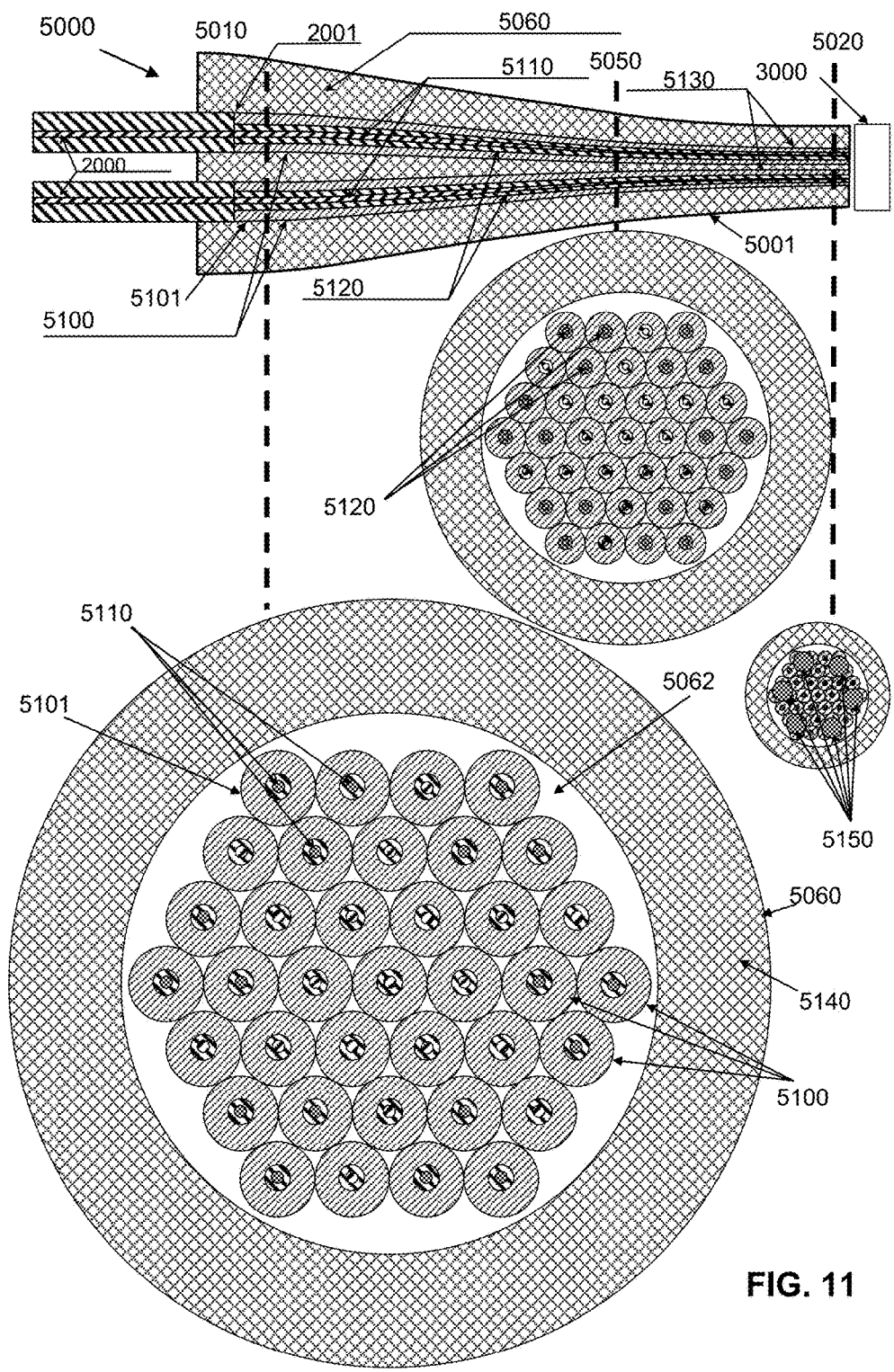

With reference now to FIG. 10 and FIG. 11, further example embodiments of optical coupler arrays 4000, 5000 are shown. The coupler arrays 4000, 5000 can be configured to couple to and from a plurality of optical fibers, such as to and from optical fibers with different mode fields and/or core sizes. In some instances, the coupler arrays 4000, 5000 can be configured to provide coupling between a set of individual isolated optical fibers 2000 and an optical device 3000 having at least one optical channel allowing for propagation of more than one optical mode. In some preferred embodiments, all isolated optical fibers 2000 can be identical (or some different in some instances) and the optical device 3000 can include at least one few-mode fiber, multimode fiber, multicore single mode fiber, multicore few-mode fiber, and/or multicore multimode fiber. Compared to certain embodiments described herein with respect to FIGS. 1A-5, various embodiments 4000, 5000 can include a further reduction of the taper diameter, which can allow light to escape the outer core 4120, 5120 and propagate in a combined waveguide 4150, 5150, formed by at least two neighboring cores. Accordingly, various embodiments described herein can be configured to optically couple between fibers with dissimilar mode fields and/or core shapes or sizes. Advantageously, some embodiments of the coupler arrays can improve and/or optimize optical coupling between one or more of single mode fibers, few-mode fibers, multimode fibers, multicore single mode fibers, multicore few-mode fibers, and/or multicore multimode fibers.

Although various features of the example coupler arrays will now be described with respect to FIGS. 10 and 11, any described feature can be implemented in any combination with the coupler arrays described with respect to FIGS. 1A-5 and 7. Further, any feature described with respect to FIGS. 1A-5 and 7 may be combined with any feature described with respect to FIGS. 10 and 11. For instance, the example coupler arrays 4000, 5000 are illustrated utilizing housing structures 4060, 5060 similar to the housing structures 801, 851 shown in FIGS. 8-9. In these examples, the cross sectional configuration of the housing structure 4060, 5060 may include a structure with a plurality of holes (e.g., multi-hole) as shown in FIG. 10, or may include one hole (e.g., single-hole surrounded by a ring), as shown in FIG. 11. However, other housing structures can also be used. For example, the housing structures described with respect to FIGS. 1A-5 and 7 may be used.

Referring to FIG. 10, certain embodiments of a multi-channel optical coupler array 4000 can include an elongated optical element 4001 having a first end 4010, an intermediate location or cross section 4050, and a second end 4020. The optical element 4001 can include a coupler housing structure 4060 and a plurality of longitudinal waveguides 4100 disposed in the housing structure 4060. The waveguides 4100 can be arranged with respect to one another in a cross-sectional geometric waveguide arrangement. In FIG. 10, the example cross-sectional geometric waveguide arrangements of the waveguides 4100 for the first end 4010, the intermediate cross section 4050, and the second end 4020 are shown. As illustrated by the shaded regions within the cross sections and as will be described herein, light can be guided through the optical element 4001 from the first end 4010, through the intermediate cross section 4050, and to the second end 4020.

As shown in FIG. 10, proximally (e.g. proximately) to the first end 4010, the housing structure 4060 (e.g., a common single coupler housing structure in some cases) can have a cross sectional configuration of a structure (e.g., transversely contiguous structure in some cases) with a plurality of holes 4062. FIG. 10 shows an example configuration with three circular holes 4062-1, 4062-2, 4062-3. However, the shape of the holes, number of holes, and/or arrangement of the holes are not particularly limited and can include any other shape, number, and/or arrangement including those described with respect to FIG. 9. At least one of the holes 4062 may contain at least one of the longitudinal waveguides 4100. A gap, such as an air gap, may separate the plurality of longitudinal waveguides 4100 from the surrounding housing structure 4060 proximally to the first end 4010. In some embodiments, there may be substantially no gap between the coupler housing structure 4060 and the waveguides 4100 at the intermediate location 4050 and/or at the second end 4020. For example, one or more gaps may be filled by housing material and/or waveguide cladding material. As described herein, in some embodiments, proximate to the first end 4010, there may be a gap between the coupler housing structure 4060 and the waveguides 4100, but proximate to the second end 4020, there may be substantially no gap between the coupler housing structure 4060 and the waveguides 4100 (or vice versa). In some embodiments, there may be substantially no gap between the coupler housing structure 4060 and the waveguides 4100 proximate the first end 4010, the intermediate location 4050, and/or at the second end 4020.

As described herein, the coupler array 4000 can be operable to optically couple with a plurality of optical fibers 2000 and/or with an optical device 3000. The coupler array 4000 can couple with the optical fibers 2000 via the plurality of waveguides 4100 proximate the first end 4010 (e.g., via a fusion splice 2001), and/or with the optical device 3000 via the plurality of waveguides 4100 proximate the second end 4020 (e.g., via a fusion splice not shown). In FIG. 10, three waveguides 4100 are shown in each of the three holes 4062-1, 4062-2, 4062-3. However, any number of waveguides 4100 for each of the holes 4062 can be used. In some embodiments, the number of waveguides 4100 may equal the number of optical fibers 2000 (e.g., 9 waveguides to couple with 9 optical fibers). In some other embodiments, the number of waveguides 4100 in at least one hole may equal the number of optical modes supported by a corresponding few-mode or multi-mode waveguide of the device 3000 (e.g. 3 waveguides in each of 3 holes to couple with three 3-mode cores of a multicore fiber). In various embodiments, the waveguides 4100 can be positioned within each hole 4062 at a spacing (e.g., predetermined in some instances) from one another. In some preferred embodiments of the multi-hole configuration, the individual holes 4062-1, 4062-2, 4062-3 may contain all the waveguides (e.g., fibers) intended to couple to at least one particular core of a few-mode, multimode and/or multicore fiber of an optical device. In some other embodiments, one or more additional fibers and/or dummy fibers (e.g., which might not guide light) may be utilized to create a particular geometrical arrangement of the active, light-guiding fiber waveguides.

In various embodiments, the plurality of waveguides 4100 can have a capacity for at least one optical mode (e.g., a predetermined mode field profile in some cases). The plurality of waveguides 4100 can include at least one vanishing core (VC) waveguide 4101. FIG. 10 illustrates all of the waveguides 4100 as VC waveguides. However, one or more Non-VC waveguides may also be used. As described herein, the VC waveguide 4101 can include an inner core (e.g., an inner vanishing core) 4110, an outer core 4120, and an outer cladding 4130 with refractive indices N-1, N-2, and N-3 respectively. The outer core 4120 can longitudinally surround the inner core 4110, and the outer cladding 4130 can longitudinally surrounding the outer core 4120. As described herein, the relative magnitude relationship between the refractive indices of the inner core 4110, outer core 4120, and the outer cladding 4130 can advantageously be N-1>N-2>N-3.

In various embodiments, the housing structure 4060 can surround the waveguides 4100. The coupler housing structure 4060 can include a medium 4140 having an index of refraction N-4. The medium 4140 can include any of those described herein. In some instances, a total volume of the medium 4140 of the coupler housing structure 4060 can be greater than a total volume of all the inner and outer cores 4110, 4120 of the VC waveguides confined within the coupler housing structure 4060. In some examples, the waveguides 4100 may be embedded in the housing structure 4060 (e.g., proximate the second end 4020).

In certain embodiments, the inner core 4110 waveguide dimensions, the outer core 4120 waveguide dimensions, refractive indices, and/or numerical apertures (NAs) are selected to increase and/or optimize coupling to the individual fibers 2000. In various embodiments, the outer core 4120 waveguide dimensions, refractive indices, NAs, and/or the cladding 4130 dimensions are selected to increase and/or optimize coupling to the optical device 3000. Various embodiments described herein can also include reflection reduction features of the pitch-reducing optical fiber array described in U.S. application Ser. No. 14/677,810, entitled "OPTIMIZED CONFIGURABLE PITCH REDUCING OPTICAL FIBER COUPLER ARRAY", which is incorporated herein in its entirety. For polarization control, some of the outer cores 4120 can be made with a non-circular cross section (e.g., elliptical as shown in FIG. 10) and a particular orientation of the outer cores 4120 can be used to increase and/or optimize optical coupling. Various embodiments described herein can also include features of any of the optical polarization mode couplers described in U.S. application Ser. No. 15/617,684, entitled "CONFIGURABLE POLARIZATION MODE COUPLER", which is incorporated herein in its entirety.

In some embodiments, the inner core 4110 size, the outer core 4120 size, the cladding 4130 size, and/or the spacing between the waveguides 4100 can reduce (e.g., simultaneously and gradually in some instances) along the optical element 4001 from the first end 4010 to an intermediate location or cross section 4050. In some embodiments, a predetermined reduction profile may be used. In the example shown in FIG. 10, at the intermediate location 4050, the inner core 4110 may be insufficient to guide light therethrough and the outer core 4120 may be sufficient to guide at least one optical mode (e.g., spatial mode).

In some embodiments, each core of a waveguide 4100 can have a capacity for at least one optical mode (e.g., single mode, few-mode, or multi-mode). For example, at the first end 4010, the VC waveguide 4101 can support a number of spatial modes (M1) within the inner core 4110. At the intermediate location 4050, in various embodiments, the inner core 4110 may no longer be able to support all the M1 modes (e.g., cannot support light propagation). However, in some such embodiments, at the intermediate location 4050, the outer core 4120 can be able to support all the M1 modes (and in some cases, able to support additional modes). In this example, light traveling within the inner core 4110 from the first end 4010 to the intermediate location 4050 can escape from the inner core 4110 into the outer core 4120 such that light can propagate within the outer core 4120.

In some embodiments, the inner core 4110 size, the outer core 4120 size, the cladding 4130 size, and/or the spacing between the waveguides 4100 can be further reduced (e.g., simultaneously and gradually in some instances) along the optical element 4001 from the intermediate location 4050 to the second end 4020. In the example shown in FIG. 10, at the second end 4020, the outer core 4120 may be insufficient to guide light therethrough.

In certain embodiments, at the intermediate location 4050, the VC waveguide 4101 can support all the M1 modes within the outer core 4120. At the second end 4020, the outer core 4120 may be no longer able to support all the M1 modes (e.g., cannot support light propagation). However, in some such embodiments, at the second end 4020, a combined core 4150 of at least two cores may be able to support all the M1 modes of all waveguides 4101 combined (and in some cases, able to support additional modes). In this example, light traveling within the outer core 4120 from the intermediate location 4050 to the second end 4020 can escape from the outer core 4120 into a combined waveguide 4150 formed by at least two outer cores (e.g., two or more neighboring cores) such that light can propagate within the combined cores. In the example shown in FIG. 10, each of the combined waveguides 4150 is formed by three outer cores. However, in some embodiments, the combined waveguides 4150 may be formed with another number of outer cores.

It would be appreciated that light travelling from the second end 4020 to the first end 4010 can behave in the reverse manner. For example, in some embodiments, light can move from the combined waveguide 4150 formed by at least two neighboring outer cores into the at least one outer core 4120 proximally to the intermediate cross section 4050, and can move from the outer core 4120 into corresponding inner core 4110 proximally to the first end 4010. In the example shown in FIG. 10, each of the combined waveguides 4150 can support three propagation modes. Travelling from the second end 4020 to the first end 4010, each propagation mode can be coupled to a corresponding outer core 4120 proximally to the intermediate cross section 4050 and move from the outer core 4120 into a corresponding inner core 4110 proximally to the first end 4010.

Referring now to FIG. 11, the example embodiment 5000 includes similar features as the example embodiment 4000 shown in FIG. 10. One difference is that the cross sectional configuration of the housing structure 5060 includes a structure with a single hole 5062 instead of a plurality of holes 4062. Similar to the example embodiment 4000 shown in FIG. 10, the optical element 5001 can include a coupler housing structure 5060 (e.g., including a medium 5140) and a plurality of longitudinal waveguides 5100 disposed in the housing structure 5060. The waveguides 5100 can be arranged with respect to one another in a cross-sectional geometric waveguide arrangement within the hole 5062. As illustrated, light can be guided through the optical element 5001 from the first end 5010, through the intermediate cross section 5050, and to the second end 5020.

As described herein, a gap may separate the plurality of longitudinal waveguides 5100 from the surrounding housing structure 5060. In some embodiments, there may be substantially no gap between the coupler housing structure 5060 and the waveguides 5100 proximate the intermediate location 5050 and/or the second end 5020. For example, in FIG. 11, although a gap is shown proximate the second end 5020, in preferred embodiments, there may be substantially no gap between the coupler housing structure 5060 and the waveguides 5100. In some embodiments, there may be substantially no gap between the coupler housing structure 5060 and the waveguides 5100 proximate the first end 5010, the intermediate location 5050, and/or the second end 5020.

In various embodiments, the plurality of waveguides 5100 can include at least one VC waveguide 5101. FIG. 11 illustrates all thirty seven of the waveguides 5100 as VC waveguides 5101 in a hexagonal arrangement. However, any arrangement may be used. In addition, any number of VC waveguides, Non-VC waveguides, and/or dummy fibers may be used. As described herein, one or more dummy fibers may be utilized to create a particular geometrical arrangement of the active, light-guiding fiber waveguides. As described herein, the VC waveguide 5101 can include an inner vanishing core 5110, an outer core 5120, and an outer cladding 5130.

In certain embodiments, the inner core 5110 waveguide dimensions, the outer core 5120 waveguide dimensions, the cladding 5130 dimensions, refractive indices, and/or the numerical apertures (NAs) can be selected to increase and/or optimize coupling to the individual fibers 2000 and/or optical device 3000. In some embodiments, the inner core 5110 size, the outer core 5120 size, the cladding 5130 size, and/or the spacing between the waveguides 5100 can reduce along the optical element 5001 from the first end 5010 to the second end 5020. In the example shown in FIG. 11, at the intermediate location 5050, the inner core 5110 of certain waveguides 5100 may be insufficient to guide light therethrough and the outer core 5120 of certain waveguides 5100 may be sufficient to guide at least one optical mode (e.g., spatial mode). In this example, proximate the second end 5020, the outer core 5120 may be insufficient to guide light therethrough. Accordingly, in some embodiments, light traveling within the outer core 5120 from the intermediate location 5050 to the second end 5020 can escape from the outer core 5120 into a combined waveguide 5150 formed by at least two outer cores (e.g., two or more neighboring cores) such that light can propagate within the combined cores. In the example shown in FIG. 11, although each of the combined waveguides 5150 is formed by three outer cores, the combined waveguides 5150 may be formed by another number of outer cores. The remaining cores (e.g., cores of waveguides or dummy fibers) may or may not guide light. Light travelling from the second end 5020 to the first end 5010 can behave in the reverse manner.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A multichannel optical coupler array for optical coupling of a plurality of optical fibers to an optical device, comprising:

an elongated optical element having a first end operable to optically couple with said plurality of optical fibers, an intermediate cross section, and a second end operable to optically couple with said optical device, and comprising:

a common single coupler housing structure; a plurality of longitudinal waveguides each positioned at a predetermined spacing from one another, each having a capacity for at least one optical mode of a predetermined mode field profile, each embedded in said common single housing structure proximally to said second end, wherein at least one of said plurality of longitudinal waveguides is a vanishing core waveguide, each said at least one vanishing core waveguide comprising:

an inner vanishing core, having a first refractive index (N-1), and having a first inner core size (ICS-1) at said first end, an intermediate inner core size (ICS-IN) at said intermediate cross section, and a second inner core size (ICS-2) at said second end; an outer core, longitudinally surrounding said inner core, having a second refractive index (N-2), and having a first outer core size (OCS-1) at said first end, an intermediate outer core size (OCS-IN) at said intermediate cross section, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plurality of longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure, is greater than a total volume of all said vanishing core waveguides inner cores and said outer cores confined within said common single coupler housing structure, and wherein said first inner vanishing core size (ICS-1), said first outer core size (OCS-1), and said predetermined spacing between said plurality of longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said intermediate inner vanishing core size (ICS-IN) is selected to be insufficient to guide light therethrough, and said intermediate outer core size (OCS-IN) is selected to be sufficient to guide at least one optical mode, and said second outer core size (OCS-2) is selected to be insufficient to guide light therethrough such that:

light traveling from said first end to said second end escapes from said inner vanishing core into said corresponding outer core proximally to said intermediate cross section, and escapes from said outer core into a combined waveguide formed by at least two neighboring outer cores proximally to said second end, and at least one waveguide mode of light traveling from said second end to said first end moves from the combined waveguide formed by at least two neighboring outer cores into said outer core proximally to said intermediate cross section, and moves from said outer core into said corresponding inner vanishing core proximally to said first end, and wherein said common single coupler housing structure proximally to said first end has a cross sectional configuration comprising a transversely contiguous structure with at least one hole, wherein the at least one hole contains at least one of said plurality of longitudinal waveguides creating a gap between the coupler housing structure and the at least one of said plurality of longitudinal waveguides.

* * * * *